(12) United States Patent
Mishima et al.

(10) Patent No.: US 11,329,577 B2
(45) Date of Patent: May 10, 2022

(54) MULTIAXIAL MOTOR CONTROL SYSTEM

(71) Applicant: Panasonic Intellectual Property Management Co., Ltd., Osaka (JP)

(72) Inventors: Masashi Mishima, Osaka (JP); Akinobu Tomita, Osaka (JP); Yoshiaki Ikeuchi, Nara (JP); Mitsutaka Okura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 94 days.

(21) Appl. No.: 16/076,007

(22) PCT Filed: Mar. 8, 2017

(86) PCT No.: PCT/JP2017/009125
§ 371 (c)(1),
(2) Date: Aug. 7, 2018

(87) PCT Pub. No.: WO2017/159472
PCT Pub. Date: Sep. 21, 2017

(65) Prior Publication Data
US 2019/0260314 A1      Aug. 22, 2019

(30) Foreign Application Priority Data

Mar. 15, 2016   (JP) .............................. JP2016-050331

(51) Int. Cl.
*H02P 3/22* (2006.01)
*H02P 5/74* (2006.01)
(Continued)

(52) U.S. Cl.
CPC ................ *H02P 3/22* (2013.01); *G05B 19/19* (2013.01); *H02P 5/00* (2013.01); *H02P 5/46* (2013.01);
(Continued)

(58) Field of Classification Search
CPC ...... H02P 3/22; H02P 5/74; H02P 6/24; H02P 6/17; H02P 5/46
See application file for complete search history.

(56) References Cited

U.S. PATENT DOCUMENTS

| | | | |
|---|---|---|---|
| 7,024,257 B2 * | 4/2006 | Pearce | H04L 12/422 700/72 |
| 2001/0024062 A1 * | 9/2001 | Yoshino | B60K 6/54 303/152 |

(Continued)

FOREIGN PATENT DOCUMENTS

| | | |
|---|---|---|
| CN | 103370664 A | 10/2013 |
| CN | 104218852 A | 12/2014 |

(Continued)

OTHER PUBLICATIONS

International Search Report of PCT application No. PCT/JP2017/009125 dated Jun. 6, 2017.
(Continued)

*Primary Examiner* — Kawing Chan
*Assistant Examiner* — Bradley R Brown
(74) *Attorney, Agent, or Firm* — McDermott Will & Emery LLP

(57) ABSTRACT

Embodiments provide a multiaxial motor control system for controlling motors for a plurality of shafts included in a multiaxial machine, and including a plurality of motor control devices and a controller. The controller is connected with the motor control devices, and transmits a command (Continued)

signal to the motor control devices. Each motor control device includes a communication controller, a rotation controller, and a drive unit, and drives a motor of a corresponding shaft. The communication controller transmits and receives signals including the command signal, and determine whether the command signal is received normally. The rotation controller generates a torque command to operate the corresponding motor. The drive unit generates a drive voltage for electrification to drive the corresponding motor in accordance with the torque command. When a motor control device detects failure in reception, the motor control device outputs a torque command for braking torque to stop the corresponding motor.

24 Claims, 22 Drawing Sheets

(51) Int. Cl.

| | | |
|---|---|---|
| *H02P 6/17* | (2016.01) | |
| *H02P 6/24* | (2006.01) | |
| *H02P 5/46* | (2006.01) | |
| *G05B 19/19* | (2006.01) | |
| *H02P 5/00* | (2016.01) | |
| *H02P 6/12* | (2006.01) | |
| *H02P 3/12* | (2006.01) | |
| *H04L 12/40* | (2006.01) | |
| *H04L 12/70* | (2013.01) | |

(52) U.S. Cl.
CPC .................. *H02P 5/74* (2013.01); *H02P 6/12* (2013.01); *H02P 6/17* (2016.02); *H02P 6/24* (2013.01); *H02P 3/12* (2013.01); *H04L 2012/4026* (2013.01); *H04L 2012/5612* (2013.01)

(56) References Cited

U.S. PATENT DOCUMENTS

| | | | | |
|---|---|---|---|---|
| 2002/0110155 A1* | 8/2002 | Pearce | .................. | H04J 3/0682 |
| | | | | 370/519 |
| 2011/0297070 A1* | 12/2011 | Riggs | ..................... | B63H 25/42 |
| | | | | 114/330 |
| 2013/0285589 A1* | 10/2013 | Sugie | ................. | G05B 19/4155 |
| | | | | 318/600 |
| 2014/0354197 A1* | 12/2014 | Ito | .......................... | H02P 21/36 |
| | | | | 318/366 |

FOREIGN PATENT DOCUMENTS

| | | |
|---|---|---|
| JP | 6-078578 | 3/1994 |
| JP | 2008-005664 | 1/2008 |
| JP | 2011-257909 | 12/2011 |
| WO | 2012/114435 | 8/2012 |

OTHER PUBLICATIONS

The Extended European Search Report dated Mar. 22, 2019 for the related European Patent Application No. 17766473.7.
Jiri Zdenek: "System Design and Software Architecture of Traction Vehicle Control Computer", Power Electronics and Motion Control Conference, 2006. EPE-PEMC 2006. 12th International, Aug. 30, 2006 (Aug. 30, 2006), pp. 1205-1210, XP055568045, Piscataway, NJ, USA.
Aki Masahiko et al.: "Safety Testing of an Improved Brake System for Automatic Platooning of Trucks", International Journal of Intelligent Transportation Systems Research, Springer US, Boston, vol. 12, No. 3, Apr. 22, 2014 (Apr. 22, 2014), pp. 98-109, XP035965213, [retrieved on Apr. 22, 2014].
English Translation of Chinese Search Report dated March 3. 2021 for the related Chinese Patent Application No. 201780016078.4.

* cited by examiner

FIG. 6A

| Period TC | T1 | T2 | | T3 | | T4 | |
|---|---|---|---|---|---|---|---|
| Period TN | ...,N,... ,N-1 | N | N+1,... | ...,N-1 | N | N+1,... | ...,N-1 | N | N+1,... |
| Controller 10 | | | | (Failure detection) | (Immediate stop command issue) | | |
| Device 201 | Failure occurs | Failure detection | Immediate stop torque value A | Stopped hereafter | | | |
| Device 202 | | Failure detection | Non-drive stop | Stopped hereafter | | | |

FIG. 6C

| Period TC | T1 | T2 | | T3 | | T4 | |
|---|---|---|---|---|---|---|---|
| Period TN | ...,N,... | ...,N-1 | N | N+1,... | ...,N-1 | N | N+1,... | ...,N-1 | N | N+1,... |
| Controller 10 | Failure occurs | Failure detection | Immediate stop command issue | | | | |
| Device 201 | | | | | Immediate stop torque value B | Stopped hereafter | |
| Device 202 | Failure occurs | | | | Immediate stop torque value B | Stopped hereafter | |

FIG. 9A

| Period TC | T1 | | T2 | | T3 | | T4 | |
|---|---|---|---|---|---|---|---|---|
| Period TN | ...,N,... | ...,N-1 | N | N+1,... | ...,N-1 | N | N+1,... | ...,N-1 | N | N+1,... |
| Controller 10 | Failure occurs | | | | (Failure detection) | (Immediate stop command issue) | | |
| Device 201 | | Failure detection | Immediate stop torque A' | Stopped hereafter | | | |
| Device 202 | | Failure detection | Non-drive stop | Stopped hereafter | | | |
| Device 203 | | Failure detection | Non-drive stop | Stopped hereafter | | | |

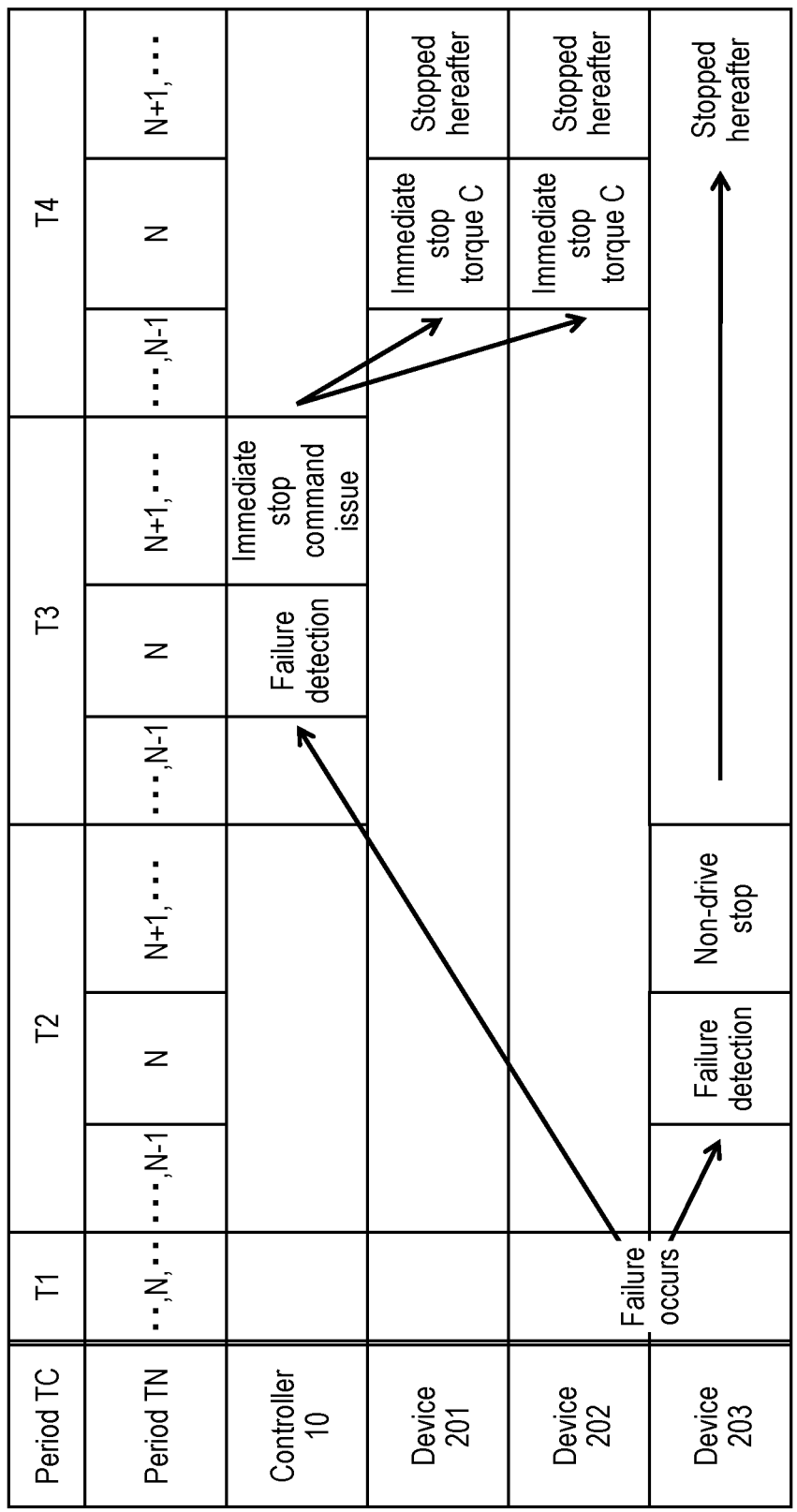

FIG. 9D

| Period TC | T1 | T2 | | | T3 | | | T4 | |
|---|---|---|---|---|---|---|---|---|---|
| Period TN | ...,N,... | ...,N-1 | N | N+1,... | ...,N-1 | N | N+1,... | ...,N-1 | N | N+1,... |
| Controller 10 | Failure occurs | Failure detection | | Immediate stop command issue | | | | | | |
| Device 201 | | | | | Immediate stop torque B' | | Stopped hereafter | | | |
| Device 202 | | | | | Immediate stop torque B' | | Stopped hereafter | | | |
| Device 203 | Failure occurs | | | | Immediate stop torque B' | | Stopped hereafter | | | |

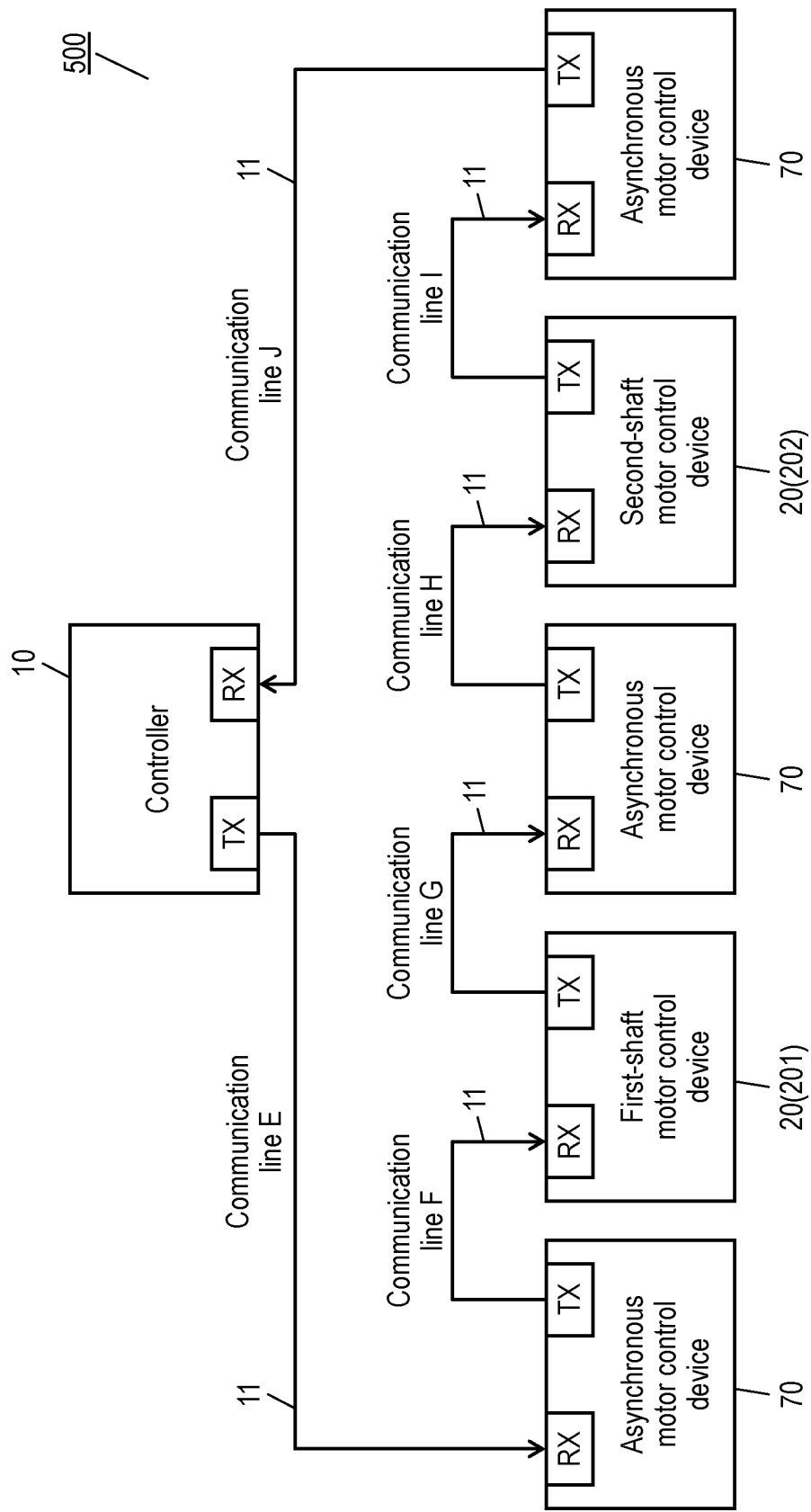

MULTIAXIAL MOTOR CONTROL SYSTEM

This application is a U.S. national stage application of the PCT International Application No. PCT/JP2017/009125 filed on Mar. 8, 2017, which claims the benefit of foreign priority of Japanese patent application 2016-050331 filed on Mar. 15, 2016, the contents all of which are incorporated herein by reference.

TECHNICAL FIELD

The present invention relates to a motor control system configured to control a multiaxial machine including a plurality of shafts.

BACKGROUND ART

There has conventionally been proposed a technique of emergently stopping a motor for safety or the like in a motor control system configured to control a multiaxial machine including a plurality of shafts and having a gantry structure or the like (see PTL 1 and the like).

Such a conventional multiaxial motor control system executes emergency stop in the following manner. The conventional system includes a controller configured to control motor control devices for a plurality of shafts via communication lines. When any one of the shafts has malfunction, the motor control device for the malfunctioning shaft initializes motor positional deviation information and notifies a functioning shaft with no malfunction of malfunction occurrence information and motor driven position information. The motor control device for the functioning shaft simultaneously causes the functioning shaft to be controlled to follow the malfunctioning shaft in accordance with the malfunction occurrence information and the motor driven position information thus received on the malfunctioning shaft. This conventional system drives and controls to cause the functioning shaft to follow in accordance with the position information on the malfunctioning shaft to decrease an interaxial error between the functioning shaft and the malfunctioning shaft and eventually stop the shafts at an identical position. The conventional system adopts a technique of executing such control to emergently stop the plurality of shafts in synchronization with each other.

CITATION LIST

Patent Literature

PTL 1: Unexamined Japanese Patent Publication No. 2011-257909

SUMMARY

The present invention provides a multiaxial motor control system configured to control motors for a plurality of shafts included in a multiaxial machine. The multiaxial motor control system includes a plurality of motor control devices and a controller. The controller has network connection with the motor control devices, and transmits a command signal for control of the motor control devices. Each of the motor control devices includes a communication controller, a rotation controller, and a drive unit, and is configured to drive a corresponding one of the motors for the plurality of shafts. The communication controller receives the command signal, transmits the received command signal, and determines whether or not the command signal is received normally. The rotation controller generates a torque command for operation of the corresponding one of the motors. The drive unit generates a drive voltage for electrification to drive the corresponding one of the motors in accordance with the torque command. When at least one of the motor control devices in the multiaxial motor control system detects failure in reception of the command signal, the at least one of the motor control devices outputs a torque command for braking torque to stop the corresponding one of the motors.

In this configuration, at least one of the motor control devices applies braking torque with the motor keeping being electrified even during communication failure that some of the motor control devices fail to receive a command signal from the controller by network communication. The multiaxial motor control system is thus configured to stop the motor in a braking distance shorter than a conventional braking distance.

BRIEF DESCRIPTION OF DRAWINGS

FIG. 6A is a chart of exemplary operation of each unit in the ring multiaxial motor control system according to the first exemplary embodiment of the present invention, in a case where communication between a controller and a first-shaft motor control device is interrupted.

FIG. 6C is a chart of exemplary operation of each unit in this multiaxial motor control system, in a case where communication between the second-shaft motor control device and the controller is interrupted.

FIG. 9A is a chart of exemplary operation of each unit in the multiaxial motor control system according to the second exemplary embodiment of the present invention, in a case where communication between a controller and a first-shaft motor control device is interrupted.

FIG. 9C is a chart of exemplary operation of each unit in this multiaxial motor control system, in a case where communication between the second-shaft motor control device and a third-shaft motor control device is interrupted.

FIG. 9D is a chart of exemplary operation of each unit in this multiaxial motor control system, in a case where communication between the third-shaft motor control device and the controller is interrupted.

FIG. 15 is a block diagram depicting a ring network configuration of a multiaxial motor control system for two shafts according to a fifth exemplary embodiment of the present invention.

DESCRIPTION OF PREFERRED EMBODIMENTS

Figure 1:
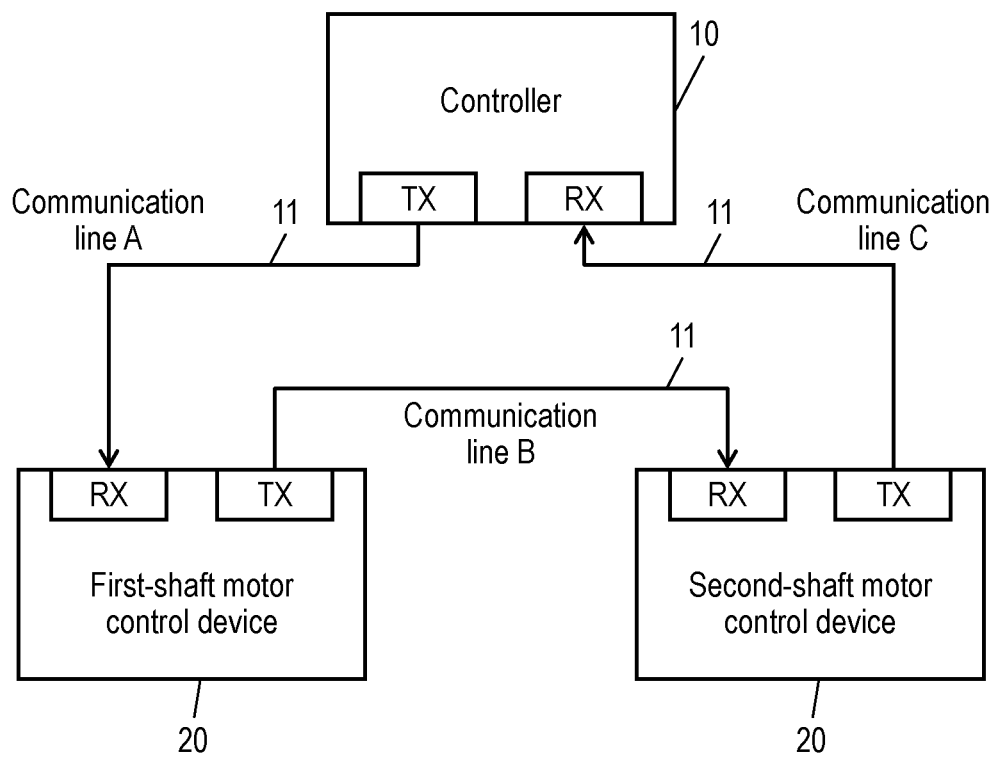
FIG. 1 is a block diagram depicting a ring network configuration as an exemplary basic configuration of a multiaxial motor control system.
Figure 2:
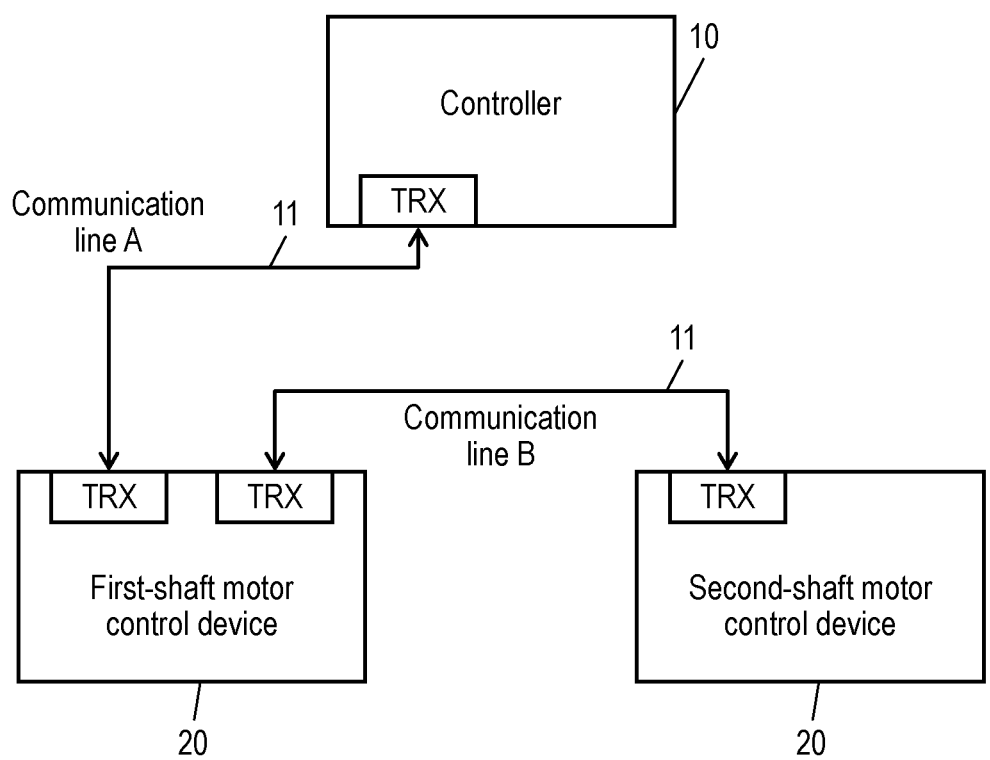
FIG. 2 is a block diagram depicting a line network configuration as another exemplary basic configuration of the multiaxial motor control system.
Figure 3:
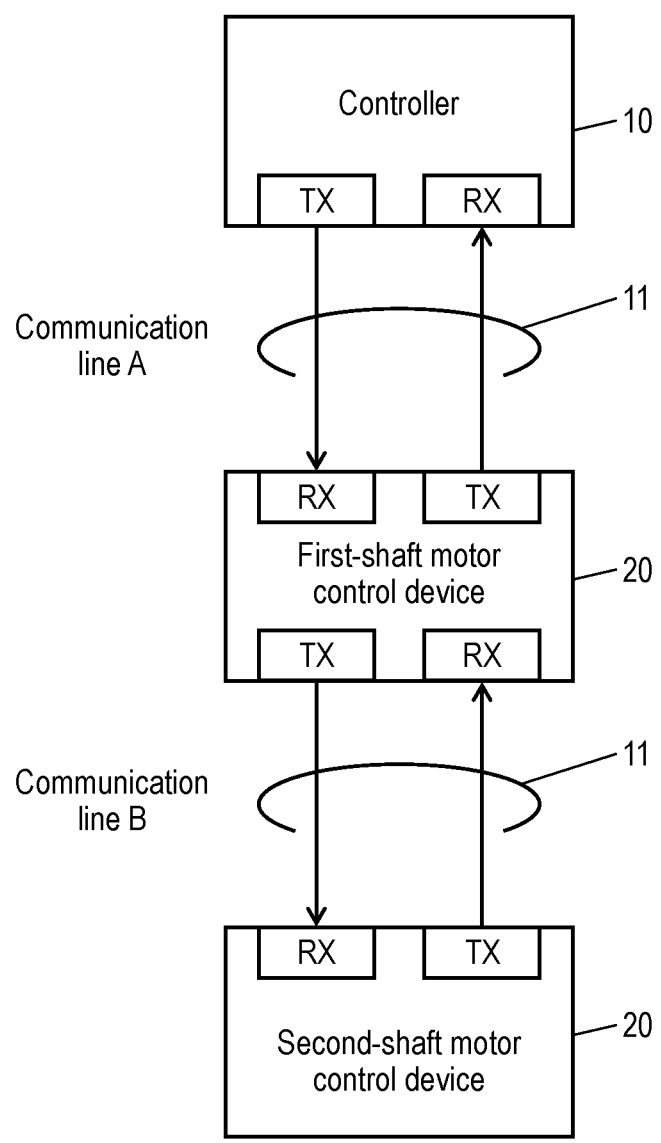
FIG. 3 is a block diagram depicting another exemplary line network configuration of the multiaxial motor control system.

FIG. 1 is a block diagram depicting a ring network configuration as an exemplary basic configuration of a multiaxial motor control system. FIG. 2 is a block diagram depicting a line network configuration as another exemplary basic configuration of the multiaxial motor control system. FIG. 3 is a diagram depicting still another exemplary basic configuration of the multiaxial motor control system having the line network. Each of these configurations includes a plurality of motor control devices 20 each configured to drive and control a corresponding motor and controller 10 configured to control motor control devices 20. Controller 10 and motor control devices 20 are communicably connected via communication lines 11 to achieve transmission and reception of data. FIG. 1 to FIG. 3 each depict an exemplarily configuration of the system including two, namely, first-shaft and second-shaft motor control devices 20 corresponding to respective shafts included in a multiaxial mechanism.

A multiaxial motor control system according to each of the following exemplary embodiments is configured as to be described later in accordance with the basic configuration depicted in FIG. 1, FIG. 2, or FIG. 3 to cause at least one motor control device 20 to output braking torque during failure or the like to emergently stop the corresponding motor. Each of the exemplary embodiments thus achieves stopping the motor in a braking distance shorter than a conventional braking distance.

The above conventional emergency stop technique accordingly requires a dedicated notification device configured to notify the functioning shaft of position information and the like on the malfunctioning shaft. In contrast, the configurations depicted in FIG. 1, FIG. 2, and FIG. 3 each disconnect communication between motor control devices 20 in an exemplary case where communication line 11 between motor control devices 20 is broken. None of these configurations thus achieves control between the malfunctioning shaft and the functioning shaft.

When communication failure to the motor control device 20 for any one of the shafts occurs, the conventional motor control system having ring or line connection adopts a method of stopping by immediately disconnecting electrification to the motor for the malfunctioning shaft and the motor for the functioning shaft.

This technique, however, requires a long braking distance until each of the motors stops because the motor is self-propelled for a while after electrification is disconnected. There is another technique of outputting braking torque to each of the motor for the malfunctioning shaft and the motor for the functioning shaft to stop the motors. This technique has safety problems such as that immediate stop causes strong stress to be applied to a load to damage the device while the braking distance can be shortened.

In view of the above, at least one motor control device 20 according to the following exemplary embodiments is configured to output braking torque to stop the motor, to suppress stress applied to a load and stop the motor in a short braking distance.

The exemplary embodiments of the present invention will now be described below with reference to the drawings. The present invention should not be limited by these exemplary embodiments.

First Exemplary Embodiment

Figure 4:
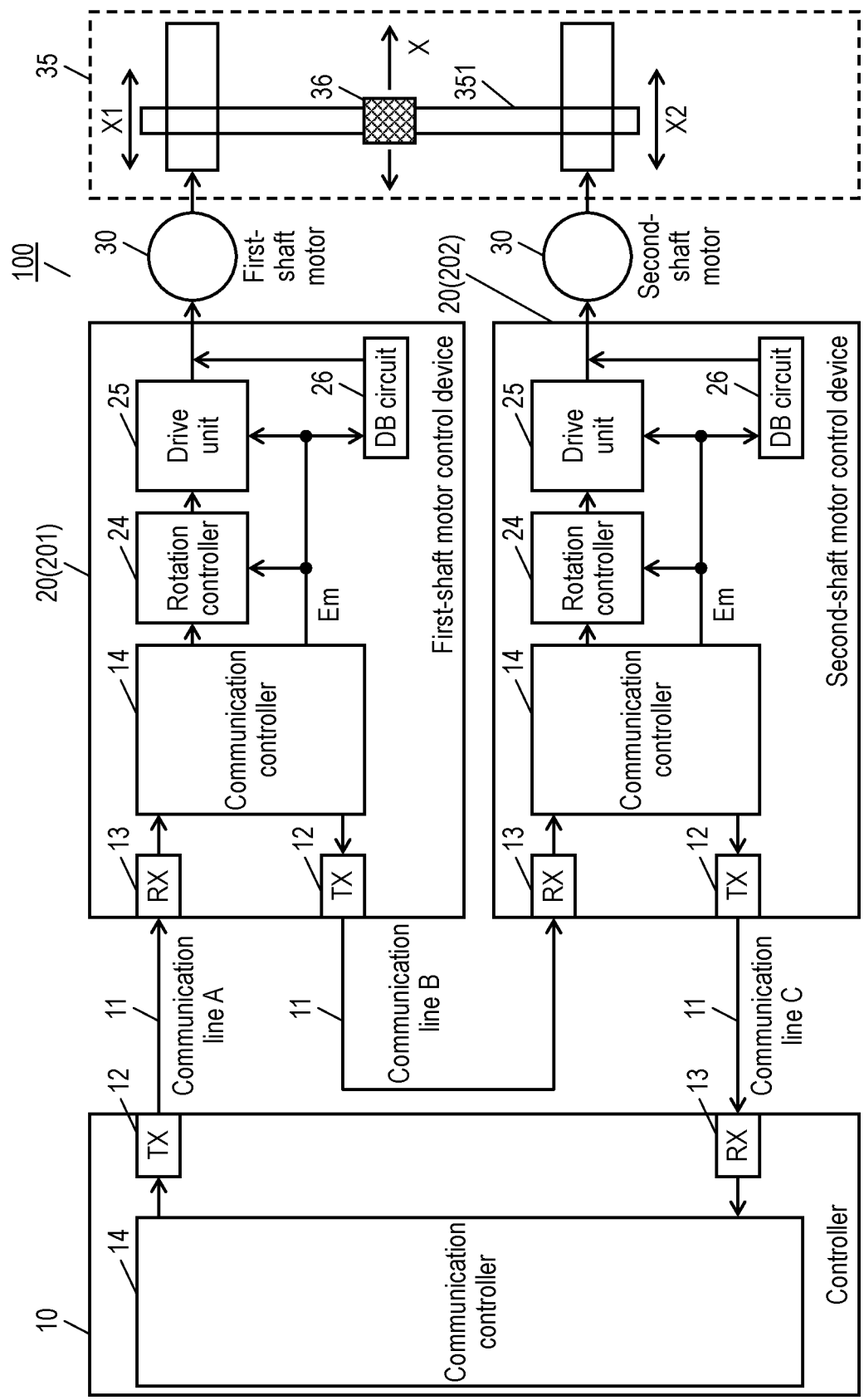
FIG. 4 is a block diagram depicting a configuration of a ring multiaxial motor control system according to a first exemplary embodiment of the present invention.

FIG. 4 is a block diagram depicting a configuration of ring multiaxial motor control system 100 according to a first exemplary embodiment of the present invention. As depicted in FIG. 4, multiaxial motor control system 100 configures a biaxial motor control system including controller 10 and two motor control devices 20 communicably connected via communication lines 11 to form a ring shape. Multiaxial motor control system 100 includes one-to-one unidirectional connection between units according to ring network topology. Controller 10 transmits a command signal for a position command, a speed command, or the like to first-shaft and second-shaft motor control devices 20, in every command update period as a reference period for transmission of a command signal. Each motor control device 20 controls operation of motor 30 in accordance with the received command signal. Hereinafter, the first-shaft motor control device will be identified as motor control device 201 and the second-shaft motor control device will be identified as motor control device 202 for appropriate specification of motor control devices 20, while each of the motor control devices will generically be called motor control device 20.

FIG. 4 depicts control target mechanism 35 as a control target of motors 30, including two shafts mechanically linked by link 351, specifically, shaft X1 controlled by first-shaft motor 30 and shaft X2 controlled by second-shaft motor 30. Control target mechanism 35 exemplifies a multiaxial machine as a multiaxial mechanism having a gantry structure. Control target mechanism 35 has the gantry structure, so that motors 30 for shafts X1 and X2 are ordinarily controlled through synchronized processing for the both shafts according to same commands. The present exemplary embodiment provides control of a position in an X direction of load 36 such that shaft X1 and shaft X2 in such a multiaxial mechanism move positionally equally in the X direction at equal speed.

As depicted in FIG. 4, controller 10 includes transmitter 12 configured to transmit data such as a command signal, receiver 13 configured to receive data, and communication controller 14 configured to control communication by transmitter 12 and receiver 13, provide and receive communication data, and the like. Each motor control device 20 similarly includes transmitter 12 configured to transmit data, receiver 13 configured to receive data, and communication controller 14 configured to control transmitter 12 and receiver 13. Controller 10 and motor control devices 20 are interconnected via communication lines 11 to form a ring shape so as to achieve transfer of data from transmitter 12 to receiver 13. FIG. 4 depicts network connection between communication controller 14 in controller 10 and communication controller 14 in motor control device 201, for data transfer via communication line 11 specified as communication line A. Furthermore, communication controller 14 in motor control device 201 and communication controller 14 in motor control device 202 have network connection for data transfer via communication line 11 specified as communication line B. Moreover, communication controller 14 in motor control device 202 and communication controller 14 in controller 10 have network connection for data transfer via communication line 11 specified as communication line C. Such connection enables communication by unidirectional ring connection of controller 10, motor control device 201, motor control device 202, and controller 10 in the mentioned order. As to be described in detail later, each communication controller 14 is configured to normally provide and receive a command signal or a response signal indicating data reception, as well as detect failure in communication (transmission or reception). Examples of possible communication failure in such multiaxial motor control system 100 include break of any communication line 11, and failure in data recovery even if any communication controller 14 corrects any error in communication data. Motor control device 20 then cannot receive a command signal from controller 10 and cannot continue normally operating the corresponding motor. Examples of the error to be corrected include a parity error, a check sum error, and a cyclic redundancy check (CRC) error.

As depicted in FIG. 4, each motor control device 20 further includes rotation controller 24 and drive unit 25 to drive and control motor 30. Each of rotation controller 24 and drive unit 25 according to the present exemplary embodiment also has a function for emergently stopping motor 30. In order to emergently stop motor 30, each motor control device 20 further includes dynamic brake (hereinafter, abbreviated as DB where appropriate) circuit 26 configured to brake motor 30 as a closed circuit including a resistor. The function for emergency stop of each of rotation controller 24 and drive unit 25, and DB circuit 26 are selectively adopted in accordance with stop command Em from communication controller 14 in the present exemplary embodiment. As described above, multiaxial motor control system 100 according to the present exemplary embodiment includes motor control devices 20 each configured to individually drive and stop motor 30.

Figure 5:
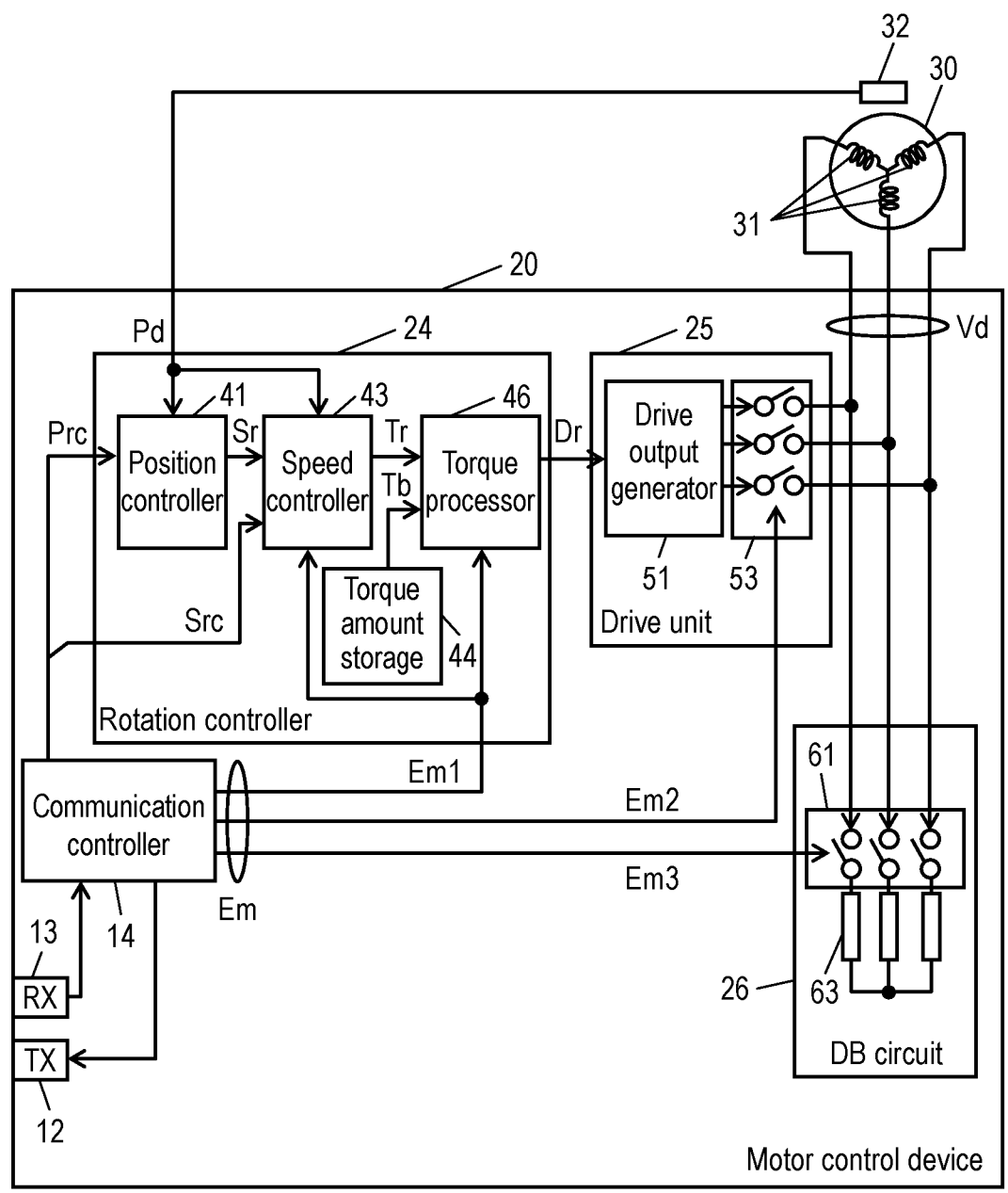
FIG. 5 is a block diagram depicting a detailed exemplary configuration of a motor control device according to the first exemplary embodiment of the present invention.

FIG. 5 is a block diagram depicting a detailed exemplary configuration of motor control device 20 thus configured according to the first exemplary embodiment of the present invention. The detailed configuration of motor control device 20 will be described next with reference to FIG. 5.

FIG. 5 exemplifies a case where motor 30 is a brushless motor that is driven in three phases of U, V, and W phases. Specifically, motor 30 includes a stator provided with coils 31 corresponding to the respective phases and a rotor retaining a permanent magnet. Coils 31 of the stator are electrified when receiving drive voltages Vd differentiated in phase from each other by 120 degrees. In this case, electric current flows through coils 31 to rotate the rotor. The corresponding shaft connected to the rotor is positionally controlled in accordance with rotation of the rotor.

In order to drive and control such rotation of motor 30, each motor control device 20 includes rotation controller 24 configured to control a position, speed, and torque of motor 30, and drive unit 25 configured to electrify to drive coils 31 of motor 30. Rotation controller 24 includes position controller 41 configured to control a position, speed controller 43 configured to control speed, torque processor 46 configured to execute torque-related processing, and the like. Drive unit 25 includes drive output generator 51 configured to generate a drive voltage corresponding to a torque amount received from rotation controller 24. In order to activate emergency stop adaptively in accordance with a situation of communication failure, each motor control device 20 according to the present exemplary embodiment includes DB circuit 26, rotation controller 24 including torque amount storage 44, and drive unit 25 including drive voltage switch 53.

Controller 10 notifies each motor control device 20 thus configured of command information by means of a command signal. Examples of major command information included in the command signal include position command Prc to position controller 41, speed command Src to speed controller 43, a torque command to torque processor 46, and stop command Em relevant to emergency stop, such as activation or deactivation of DB circuit 26. FIG. 5 typically depicts a configuration in which communication controller 14 transmits position command Prc to position controller 41, transmits speed command Src to speed controller 43, and transmits stop command Em to each of rotation controller 24, drive unit 25, and DB circuit 26, in accordance with the received command signal. As depicted in FIG. 5, position detector 32 disposed at motor 30 notifies position controller 41 of detected position information Pd indicating a position of the rotor in motor 30.

When motor control device 20 operates normally with no communication failure or the like, rotation controller 24 controls rotation such that a rotational position of the rotor in motor 30 follows position command Pre from controller 10 or the like through feedback control with reference to detected position information Pd from position detector 32.

In order to execute such feedback control, position controller 41 in rotation controller 24 initially calculates a positional deviation as difference between position command Prc and detected position information Pd from position detector 32. Position controller 41 then obtains speed command Sr by arithmetic operation such as multiplication of the positional deviation by a position gain, and notifies speed controller 43 of obtained speed command Sr.

Speed controller 43 subsequently obtains rotational speed of motor 30 by arithmetic operation such as differentiation of detected position information Pd thus received. Speed controller 43 further calculates a speed deviation as difference between the calculated rotational speed and speed command Sr. Speed controller 43 then executes arithmetic operation such as proportion and integration of the speed deviation to obtain torque command Tr corresponding to a driving torque amount of operating motor 30. Speed controller 43 notifies torque processor 46 of torque command Tr thus obtained.

Torque processor 46 then transmits, to drive unit 25, torque command Tr corresponding to the driving torque amount as voltage command signal Dr, in a case where communication failure or the like does not occur.

Drive unit 25 generates drive voltage Vd in accordance with voltage command signal Dr provided from rotation controller 24. Specifically, drive output generator 51 includes an inverter having a pulse width modulation (PWM) circuit and a switching element. Drive output generator 51 generates a pulse signal that is pulse width modulated by the PWM circuit in accordance with voltage command signal Dr, and generates drive voltage Vd through ON/OFF control of the switching element in the inverter in accordance with the pulse signal. During normal operation, drive unit 25 applies, to coils 31 for the respective phases via drive voltage switch 53 in an ON state, drive voltage Vd thus generated to drive motor 30.

DB circuit 26 includes DB switches 61 and DB resistors 63. DB switches 61 in DB circuit 26 are each configured to switch between connection and disconnection of corresponding DB resistor 63 with respect to drive voltage Vd thus output from drive unit 25.

Multiaxial motor control system 100 thus configured may have break or the like of at least one of communication lines 11, namely, communication line A, communication line B, or communication line C, or failure in communication function or the like of any motor control device 20. Furthermore, there may occur communication failure such as that any motor control device 20 cannot receive a command signal from controller 10 or cannot transmit a response signal to controller 10. In the present exemplary embodiment, motor control device 20 selectively adopts the function for emergency stop of each of rotation controller 24 and drive unit 25 or DB circuit 26 to stop driving the corresponding motor when such communication failure is detected.

Such stop of driving the motor will be described in detail next. The present exemplary embodiment provides the following three functions for stop of driving the motor.

These functions include a first function (hereinafter, called an immediate stop function) of immediately stopping motor 30 by causing rotation controller 24 to generate braking torque. In order to enable this immediate stop function, speed controller 43 is configured to operate in accordance with a zero speed command as a speed command for speed of zero. Rotation controller 24 includes torque amount storage 44 configured to store a preset braking torque amount and the like. As depicted in FIG. 5, motor control device 20 is configured to cause communication controller 14 to notify speed controller 43 and torque processor 46 of stop command Em1. This immediate stop function is activated or deactivated in accordance with stop command Em1.

During normal operation, stop command Em1 indicates deactivation of immediate stop, and speed controller 43 calculates torque command Tr following speed command Sr from position controller 41 or speed command Src from communication controller 14, and outputs calculated torque command Tr. The immediate stop is deactivated in this case. Torque processor 46 accordingly selects torque command Tr from speed controller 43 and transmits voltage command signal Dr corresponding to torque command Tr to drive unit 25. Normal operation thus continues.

In contrast, when stop command Em1 indicates activation of the immediate stop, speed controller 43 initially switches from operation according to speed command Sr or speed command Src to operation according to the zero speed command. Motor 30 in operation at certain speed is then controlled to have zero speed, and speed controller 43 generates torque command Tr corresponding to braking torque for stopping rotation of motor 30. The immediate stop is activated in this case. Torque processor 46 accordingly reads out of torque amount storage 44 braking torque command Tb indicating a predetermined braking torque amount, and transmits voltage command signal Dr corresponding to braking torque command Tb to drive unit 25. Drive unit 25 accordingly applies, to each coil 31, drive voltage Vd for braking rotation of motor 30, and rotation of motor 30 is stopped.

The functions for stop of driving the motor also includes a second function (hereinafter, called a non-drive stop function) of naturally stopping motor 30 by stopping supply of drive voltage Vd from drive unit 25 to motor 30. In order to enable this non-drive stop function, drive unit 25 includes drive voltage switch 53 configured to switch between connection and disconnection of the drive voltage output from drive output generator 51 to and from coils 31 in motor 30. Drive voltage switch 53 is switched ON or OFF in accordance with second stop command Em2 from communication controller 14 as depicted in FIG. 5.

During normal operation, stop command Em2 indicates deactivation of non-drive stop, drive voltage switch 53 is ON, and drive output generator 51 is connected to coils 31 to enable transmission. Drive unit 25 accordingly supplies coils 31 with a voltage output from drive output generator 51 as drive voltage Vd. In contrast when stop command Em2 indicates activation of the non-drive stop, drive voltage switch 53 is switched OFF and drive unit 25 is disconnected from coils 31 to disable transmission. In this disconnected state, drive unit 25 does not apply drive voltage Vd to coils 31 and coils 31 are not electrified, so that motor 30 naturally stops without being driven. In place of drive voltage switch 53, the switching element in the inverter included in drive output generator 51 can be configured to switch between connection and disconnection of drive voltage Vd.

The functions for stop of driving the motor also includes a third function (hereinafter, called a DB stop function) of stopping motor 30 by activating dynamic braking of DB circuit 26. In order to enable this DB stop function, DB circuit 26 described above is provided. When the DB stop function is activated, the non-drive stop function described above is also activated.

As depicted in FIG. 5, DB circuit 26 includes DB switches 61 and DB resistors 63 corresponding to the respective phases. DB switches 61 each have a first end connected to an input port for drive voltage Vd of corresponding coil 31, and a second end connected to a first end of corresponding DB resistor 63, and DB resistors 63 have second ends connected to each other. Each DB switch 61 is switched ON or OFF in accordance with third stop command Em3 from communication controller 14.

During normal operation, stop command Em3 indicates deactivation of DB stop, DB switches 61 are OFF, and DB resistors 63 are not connected to coils 31. In contrast when stop command Em3 indicates activation of the DB stop, DB switches 61 are switched ON, and DB resistors 63 are connected to coils 31. This causes a plurality of output terminals of motor control device 20 to motor 30, specifically, drive voltage supply terminals of coils 31, to be short-circuited via DB resistors 63. DB resistors 63 accordingly receive counter electromotive force generated from coils 31 while motor 30 is rotating, and convert energy of the counter electromotive force to thermal energy to be consumed. The DB stop function enables, through the operation described above, generation of torque for braking rotation of motor 30, to stop motor 30.

As described above, rotation controller 24 generates torque command Tr in accordance with a command signal, and drive unit 25 outputs drive voltage Vd corresponding to torque command Tr to drive motor 30. Rotation controller 24 further outputs braking torque command Tb having an amount preset in motor control device 20, to execute the immediate stop of motor 30 or the non-drive stop by disconnecting electrification to motor 30 as describe above. Upon such non-drive stop, DB circuit 26 can be activated or deactivated to achieve braking (DB stop) through dynamic braking.

The above description assumes communication failure. The immediate stop can obviously be executed as a type of operation during normal operation of motor 30 also during normal communication. In order to execute the immediate stop during normal communication, controller 10 can transmit, to speed controller 43 in each motor control device 20, a zero speed command to cause motor 30 to have zero speed. Speed controller 43 accordingly generates, as torque command Tr, a braking torque output command indicating a braking torque mount necessary for the immediate stop. The zero speed command and the braking torque output command for the immediate stop intimately relate to each other. Specifically, torque processor 46 is connected to speed controller 43 and comprehensively controls an amount of output braking torque with reference also to speed control information.

During communication failure, communication controller 14 controls the units in motor control device 20 detecting the communication failure, not in accordance with a command from controller 10. When communication failure occurs, communication controller 14 outputs stop command Em according to a situation of the failure. In an exemplary case where communication controller 14 outputs first stop command Em1, rotation controller 24 executes processing similarly to a case where the zero speed command is received normally from controller 10. As described above, rotation controller 24 reads out of torque amount storage 44 braking torque command Tb corresponding to the preset braking torque amount necessary for execution of the immediate stop function, and transmits, to drive unit 25, braking torque command Tb as voltage command signal Dr. Drive unit 25 further transmits, to coils 31, drive voltage Vd corresponding to voltage command signal Dr. In a case where motor control device 20 executes the immediate stop function and DB circuit 26 is deactivated, braking torque for braking motor 30 obviously corresponds to braking torque command Tb output from torque processor 46.

Multiaxial motor control system 100 thus configured will be described next in terms of operation and effects.

Figure 6B:
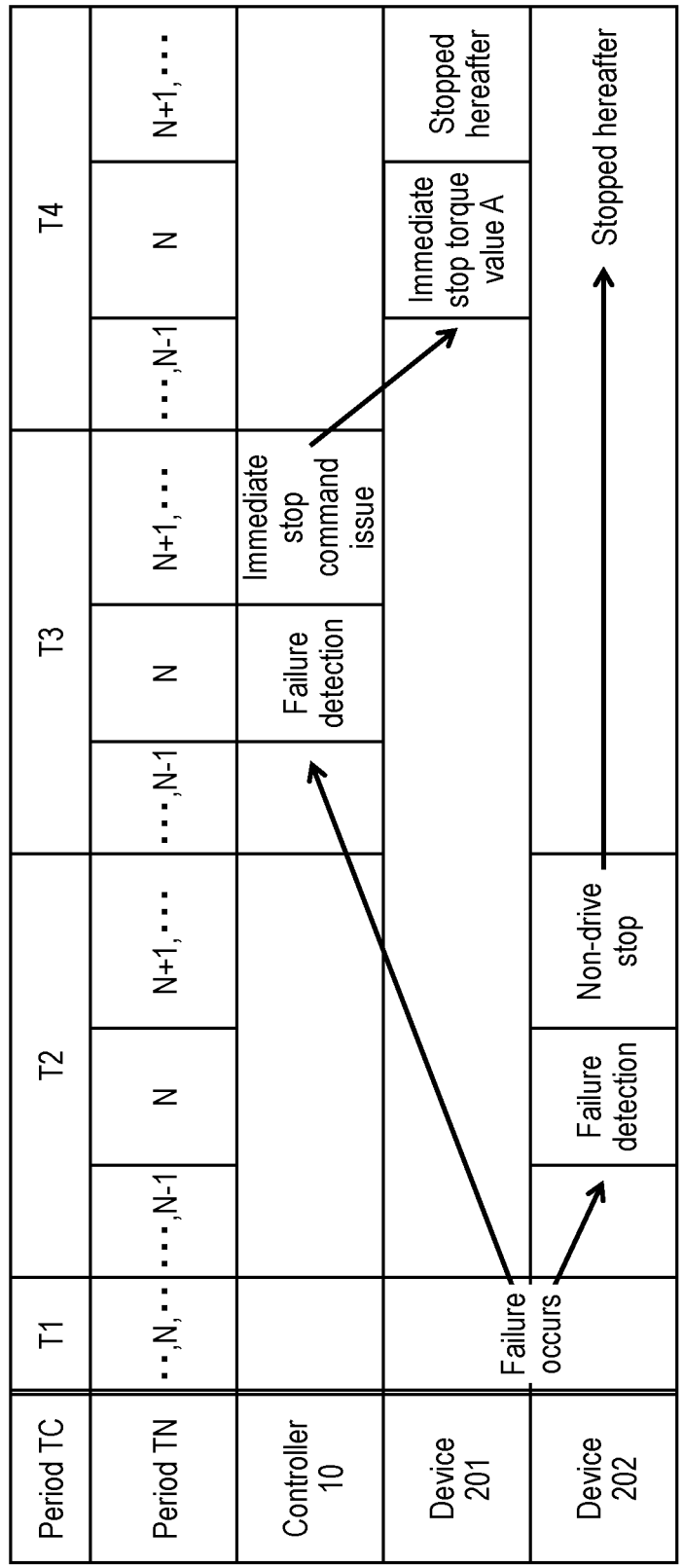
FIG. 6B is a chart of exemplary operation of each unit in this multiaxial motor control system, in a case where communication between the first-shaft motor control device and a second-shaft motor control device is interrupted.

FIG. 6A, FIG. 6B, and FIG. 6C (hereinafter, mentioned as FIG. 6A to FIG. 6C where appropriate) each indicate chronological operation of controller 10 and motor control devices 20 in a case where multiaxial motor control system 100 for two shafts depicted in FIG. 4 has communication failure as described above. FIG. 6A indicates exemplary operation of each unit in a case where communication between controller 10 and first-shaft motor control device 201 is interrupted. FIG. 6B indicates exemplary operation of each unit in a case where communication between first-shaft motor control device 201 and second-shaft motor control device 202 is interrupted. FIG. 6C indicates exemplary operation of each unit in a case where communication between second-shaft motor control device 202 and controller 10 is interrupted. For better comprehension of operation according to the present exemplary embodiment, FIG. 6A to FIG. 6C each indicate mainly operation of controller 10 and motor control devices 20 relevant to emergency stop of motors 30 upon detection of communication failure.

Initially described is relation between command update period TC of controller 10 and motor control/communication period TN of motor control devices 20 (hereinafter, command update period TC and motor control/communication period TN will be abbreviated as period TC and period TN, respectively, where appropriate). As described above, period TC is a reference period for transmission of a command signal. One period TC includes at least one period TN as a reference period for execution of motor control and communication in each motor control device 20. As indicated in FIG. 6A to FIG. 6C, the present exemplary embodiment assumes that one period TC includes a plurality of periods TN. Period TC and period TN are preset before multiaxial motor control system 100 operates. Occurrence of communication failure and detection of the failure in controller 10 and motor control devices 20 can be included in identical period TC or periods TC different from each other, depending on relation between set values of these two periods. Operation from issue of a command signal by controller 10 at certain timing until drive and stop of motors 30 by motor control devices 20 for the plurality of shafts is executed in an identical period for motor control devices 20. Operation from occurrence of communication failure at certain timing until detection of the communication failure by communication controllers 14 in motor control devices 20 is also executed in an identical period for motor control devices 20. The identical period for motor control devices 20 is preferred to be identical motor control/communication period TN in the present exemplary embodiment.

Exemplarily described below is detailed operation during periods TC=T2 to T4 subsequent to command update period TC=T1 during which communication failure occurs, after detection of the failure by controller 10 and motor control devices 20. As indicated in FIG. 6A to FIG. 6C, command update periods TC are specified as periods T1, T2, T3, and T4 in this order, and periods TC each include a predetermined number of periods TN. When an equal sign "=" is used as in period TC=T1, command update period TC corresponds to period T1.

Arrows in FIG. 6A to FIG. 6C indicate a flow of operation (processing) by controller 10 and motor control devices 20. Arrows of solid lines indicate a flow of processing directly relevant to operation for emergency stop of motors 30. Arrows of broken lines indicate a flow of processing not directly relevant to the operation for emergency stop of motors 30. In an exemplary case where communication speed between the devices and processing speed of the devices are sufficiently high, processing relevant to the operation for emergency stop executed during periods TC=T2 to T4 can optionally be entirely executed by the end of any one of periods TC=T2 to T4. The following practical examples assume that one or two processing is executed during each period TC, for better comprehension of the processing flow of controller 10 and motor control devices 20.

Each exemplary operation to be described below relates to operation upon detection of communication failure. The following description will thus not include normal operation executed before period TC=T1.

(Exemplary Operation 1A)

Operation of each unit in a case where communication between controller 10 and first-shaft motor control device 201 is interrupted will be described initially as exemplary operation 1A. Hereinafter, first-shaft motor control device 201 and second-shaft motor control device 202 will be abbreviated as device 201 and device 202, respectively, where appropriate.

As FIG. 6A indicates "failure occurs", communication between controller 10 and device 201 is interrupted during command update period TC=T1, due to break or the like of communication line A, or failure in communication function or the like of device 201 itself.

In response to such a fact that "failure occurs", communication controller 14 in each of device 201 and device 202 detects communication failure subsequently during period TN=N (N is a natural number, the same applies hereinafter) in period TC=T2.

Because the communication failure is detected in each of device 201 and device 202, device 201 and device 202 each switch from operation according to a command received from controller 10 to operation according to individual control for the own device, subsequently during period TN=N+1 in period TC=T2. Device 201 executes the immediate stop as indicated in FIG. 6A, in accordance with braking torque command Tb having braking torque value A preset in torque amount storage 44 in rotation controller 24. Specifically, in device 201, communication controller 14 outputs stop command Em1 indicating activation of the immediate stop, and rotation controller 24 executes the immediate stop function. Stop commands Em2 and Em3 indicate deactivation in this case.

Meanwhile, as indicated in FIG. 6A, device 202 executes the non-drive stop during period TN=N+1 in period TC=T2. Specifically, in device 202, communication controller 14 outputs stop command Em2 indicating activation of the non-drive stop, and drive unit 25 executes the non-drive stop function. For execution of the non-drive stop, it is more preferred that communication controller 14 outputs stop command Em3 indicating activation of the DB stop, to activate DB circuit 26 and apply the DB stop through dynamic braking.

Braking torque value A for the immediate stop in exemplary operation 1A is preferably equal in amount to allowable maximum torque of multiaxial motor control system 100. The maximum torque value is set to minimize a stop distance of each of a plurality of drive shafts. Although torque less than the maximum torque leads to a longer stop distance, the torque amount can be determined in consideration of a stop position error between the plurality of shafts, heat generation by the DB circuits, and the like, to be necessary and sufficient.

Exemplary operation 1A does not adopt the conventional technique of immediately disconnecting electrification to every motor 30 for the non-drive stop when communication failure occurs between controller 10 and device 201, but includes application of braking torque by the immediate stop function while at least one motor 30 keeps being electrified. Execution of failure handling operation according to exemplary operation 1A enables motors 30 for the plurality of shafts to stop quickly and safely.

Subsequently during period TC=T3, controller 10 detects communication failure and issues an immediate stop command for every motor 30. However, communication between controller 10 and device 201 has failure. A command signal from controller 10 obviously fails to reach each of device 201 and device 202 to be disregarded. Even if communication is recovered to a normal condition during period TC=T3, device 201 and device 202 are already stopped and the immediate stop command is thus disregarded in exemplary operation 1A.

As described above, device 201 and device 202 each detect failure in exemplary operation 1A. In order to execute exemplary operation 1A, multiaxial motor control system 100 according to the present exemplary embodiment is configured such that device 202 having detected failure disconnects electrification to motor 30, and device 201 not disconnecting electrification outputs drive voltage Vd according to braking torque command Tb preset in rotation controller 24, so as to stop motors 30.

Multiaxial motor control system 100 is configured as described above and thus executes a procedure obtained by combining the immediate stop function and the non-drive stop function during failure. Accordingly, the shaft to which the immediate stop is applied stops quickly whereas the shaft to which the non-drive stop is applied gradually stops naturally. Particularly in a case where the gantry structure like control target mechanism 35 depicted in FIG. 4 is a control target, shaft X1 stops immediately whereas shaft X2 moves slowly to stop, for example. The entire control target comes to stop through such movement, so that stress applied to load 36 can be decreased in comparison to operation of immediately stopping both shaft X1 and shaft X2. Furthermore, one of the shafts stops immediately and can thus needs a shorter stop distance and shorter stop time in comparison to operation of naturally stopping all the shafts.

The present exemplary embodiment exemplifies the case where there are provided the two motor control devices. In a case where there are provided motor control devices for a plurality of shafts, the following configuration will be applicable. Specifically, when at least one motor control device detects failure in reception of a command signal, the at least one motor control device having detected the failure disconnects electrification to the motor. At least one of the motor control devices not disconnecting electrification to the motor outputs a torque command for braking torque preset in the rotation controller to stop the motor. Such a configuration achieves similar effects.

(Exemplary Operation 1B)

Operation of each unit in a case where communication between device 201 and device 202 is interrupted will be described next as exemplary operation 1B.

As FIG. 6B indicates "failure occurs", communication between device 201 and device 202 is interrupted during command update period TC=T1, due to break or the like of communication line B, or failure in communication function or the like of device 202 itself.

Subsequently during period TN=N in period TC=T2, communication controller 14 in device 201 normally receives a command from controller 10, and device 201 executes ordinary operation. Meanwhile, communication controller 14 in device 202 detects communication failure in response to the fact that "failure occurs".

Because the communication failure is detected in device 202, device 202 switches from operation according to a command received from controller 10 to operation according to individual control for the own device to execute the non-drive stop, subsequently during period TN=N+1 in period TC=T2. Specifically, in device 202, communication controller 14 outputs stop command Em2 indicating activation of the non-drive stop, and drive unit 25 executes the non-drive stop function. For execution of the non-drive stop, it is more preferred to activate DB circuit 26 and apply the DB stop through dynamic braking as described in exemplary operation 1A.

Subsequently during period TC=T3, controller 10 detects communication failure and issues an immediate stop command for every motor 30. In this case, device 201 continues the ordinary operation whereas device 202 is kept in a non-drive stop state.

Subsequently during period TC=T4, a command signal issued from controller 10 for the immediate stop command to every motor 30 is received by device 201, and device 201 executes the immediate stop at braking torque value A. In this case, communication controller 14 in device 201 transmits stop command Em1 to rotation controller 24 or the like in accordance with the immediate stop command from controller 10. Torque processor 46 in device 201 then reads braking torque command Tb having braking torque value A from torque amount storage 44. The immediate stop function is executed in device 201 in this manner. In contrast, the command signal from controller 10 is obviously not received by device 202 to be disregarded, and device 202 is kept in the non-drive stop state.

Braking torque value A for the immediate stop in exemplary operation 1B is preferably equal in amount to allowable maximum torque of multiaxial motor control system 100. The maximum torque is set to minimize the stop distance of each of the drive shafts. Although torque less than the maximum torque leads to a longer stop distance, the torque amount can be determined in consideration of a stop position error between the plurality of shafts, heat generation by the DB circuits, and the like, to be necessary and sufficient.

Exemplary operation 1B does not adopt the conventional technique of immediately disconnecting electrification to every motor 30 for the non-drive stop when communication failure occurs between device 201 and device 202, but includes application of braking torque by the immediate stop function while at least one motor 30 keeps being electrified. Execution of failure handling operation according to exemplary operation 1B enables motors 30 for the plurality of shafts to stop quickly and safely.

As described above with reference to exemplary operation 1B, multiaxial motor control system 100 according to the present exemplary embodiment is configured such that device 202 having detected failure disconnects electrification to motor 30, and device 201 not disconnecting electrification outputs drive voltage Vd corresponding to braking torque command Tb according to a command signal received normally from controller 10, so as to stop motors 30.

Multiaxial motor control system 100 is also configured as described above and thus executes the procedure obtained by combining the immediate stop function and the non-drive stop function during failure, as in exemplary operation 1A. Stress applied to load 36 can thus be decreased in comparison to operation of immediately stopping both shaft X1 and shaft X2 in FIG. 4. Furthermore, one of the shafts stops immediately and can thus needs a shorter stop distance and shorter stop time in comparison to operation of naturally stopping all the shafts.

The present exemplary embodiment exemplifies the case where there are provided the two motor control devices. In a case where there are provided motor control devices for a plurality of shafts, the following configuration will be applicable. Specifically, when at least one motor control device detects failure in reception of a command signal, the at least one motor control device having detected the failure disconnects electrification to the motor. When at least one of the motor control devices not cancelling electrification to the motor outputs a torque command for braking torque according to a command signal received normally from the controller to stop the motor. Such a configuration achieves similar effects.

(Exemplary Operation 1C)

Operation of each unit in a case where communication between device 202 and controller 10 is interrupted will be described next as exemplary operation 1C. Exemplary operation 1C relates only to multiaxial motor control system 100 having ring connection.

As FIG. 6C indicates "failure occurs", communication between device 202 and controller 10 is interrupted during command update period TC=T1, due to break or the like of communication line C, or failure in communication function or the like of controller 10 itself.

Subsequently during period TN=N in period TC=T2, controller 10 detects communication failure and issues an immediate stop command for every motor 30. Device 201 and device 202 each continue the ordinary operation.

Subsequently during period TC=T3, device 201 and device 202 each execute the immediate stop at braking torque value B in accordance with the command received from controller 10. Braking torque value B for the immediate stop in exemplary operation 1C preferably has an amount obtained through dividing allowable maximum torque of multiaxial motor control system 100 by a number of shafts to be immediately stopped. The two shafts are immediately stopped in the present exemplary operation, so that braking torque value B preferably has an amount obtained through dividing the maximum torque by two as the number of the shafts. In other words, braking torque value B corresponds to a half of braking torque A mentioned above. Furthermore, two amounts of torque are more preferred to match each other to be an identical amount, so as to minimize the stop distances of the plurality of drive shafts. In consideration of safety and the like, braking torque can be set for each of the motor control devices such that a sum of the braking torque output from all the motor control devices is equal to or less than allowable maximum braking torque of the present multiaxial motor control system.

Exemplary operation 1C also does not adopt the conventional technique of immediately disconnecting electrification to every motor 30 for the non-drive stop when communication failure occurs between device 202 and controller 10, but includes application of braking torque such that the maximum braking torque is dispersed to the respective shafts while every motor 30 keeps being electrified. Execution of failure handling operation according to exemplary operation 1C enables motors 30 for the plurality of shafts to stop quickly and safely.

As described above with reference to exemplary operation 1C, multiaxial motor control system 100 according to the present exemplary embodiment is configured such that, when controller 10 detects failure in reception of a response signal from device 202 to a command signal, all of device 201 and device 202 each output braking torque according to the command signal from controller 10 to stop motor 30.

The above description relates to ring multiaxial motor control system 100 configured as depicted in FIG. 4, but is applicable also to a line multiaxial motor control system.

Figure 7:
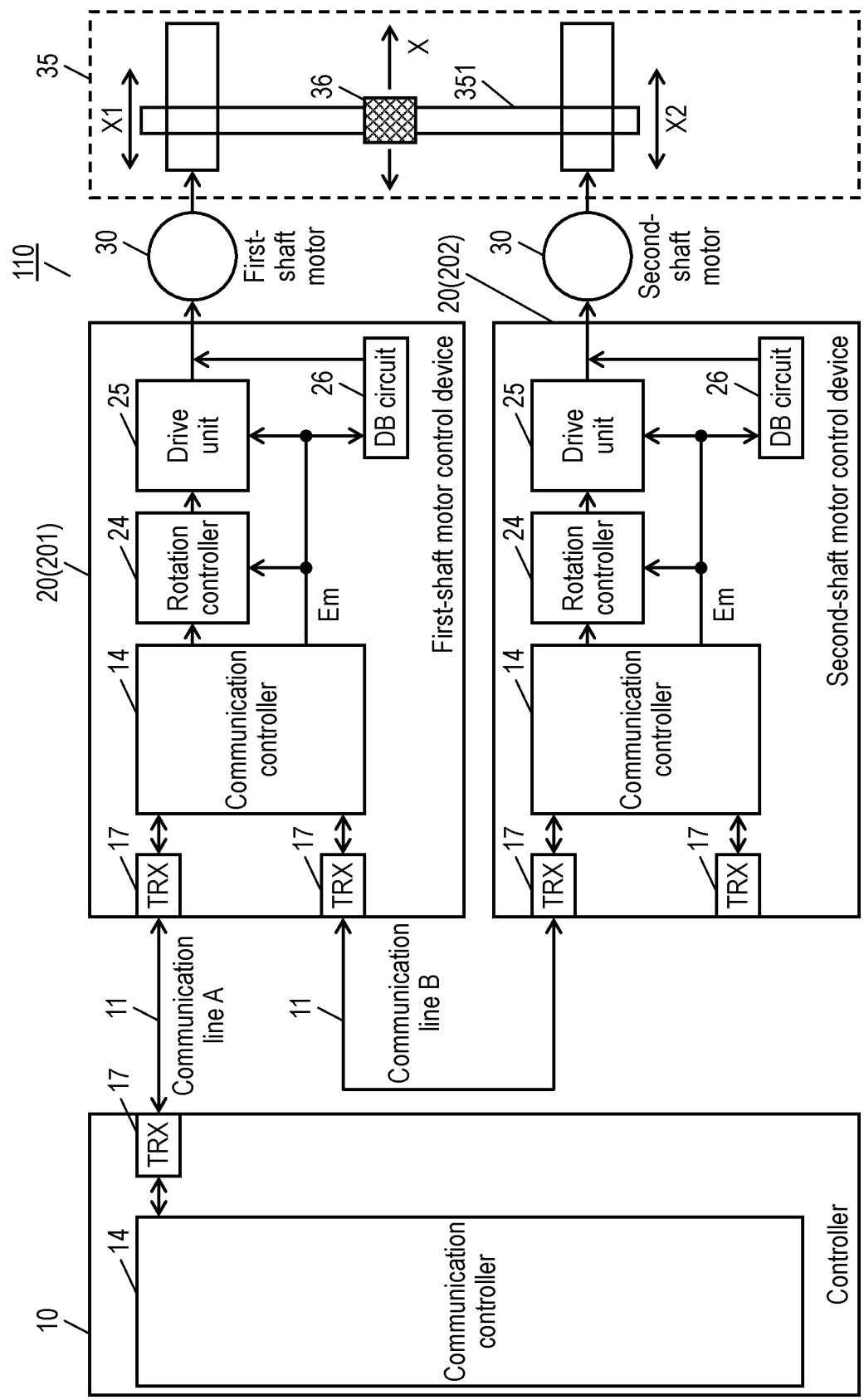
FIG. 7 is a block diagram depicting a configuration of a line multiaxial motor control system according to the first exemplary embodiment of the present invention.

FIG. 7 is a block diagram depicting a configuration of line multiaxial motor control system 110 as another exemplary configuration of the multiaxial motor control system according to the first exemplary embodiment of the present invention. Line multiaxial motor control system 110 depicted in FIG. 7 is different from the motor control system depicted in FIG. 4 in that there is provided no communication line C connecting between controller 10 and second-shaft motor control device 202, and controller 10 and motor control devices 20 are connected to each other by means of bidirectional line connection via transmitting-receiving devices 17. The configuration to stop motors 30 during failure as described with reference to each of exemplary operation 1A to exemplary operation 1C is also applicable to this line connection system.

The above description exemplifies control of control target mechanism 35 having the gantry structure as in FIG. 4 or FIG. 7. The control target mechanism has only to include a plurality of drive shafts controlled by single controller 10. Specifically, the control target mechanism can include a plurality of mechanically linked drive shafts as typically exemplified in the gantry structure, or can alternatively include a plurality of drive shafts not mechanically linked but controlled by single controller 10. The above description exemplifies the case of synchronously controlling the plurality of mechanically linked drive shafts. The plurality of drive shafts not mechanically linked can be controlled in a similar manner. Still alternatively, controller 10 controls motor control devices for a plurality of shafts to be synchronously controlled, assuming that the shafts include one master shaft and remaining slave shafts. In this case, motor control devices 20 each include a storage device (e.g., a volatile or nonvolatile memory or a register) storing a preset parameter indicating whether motor control device 20 corresponds to the master shaft or one of the slave shafts.

Second Exemplary Embodiment

Figure 8:
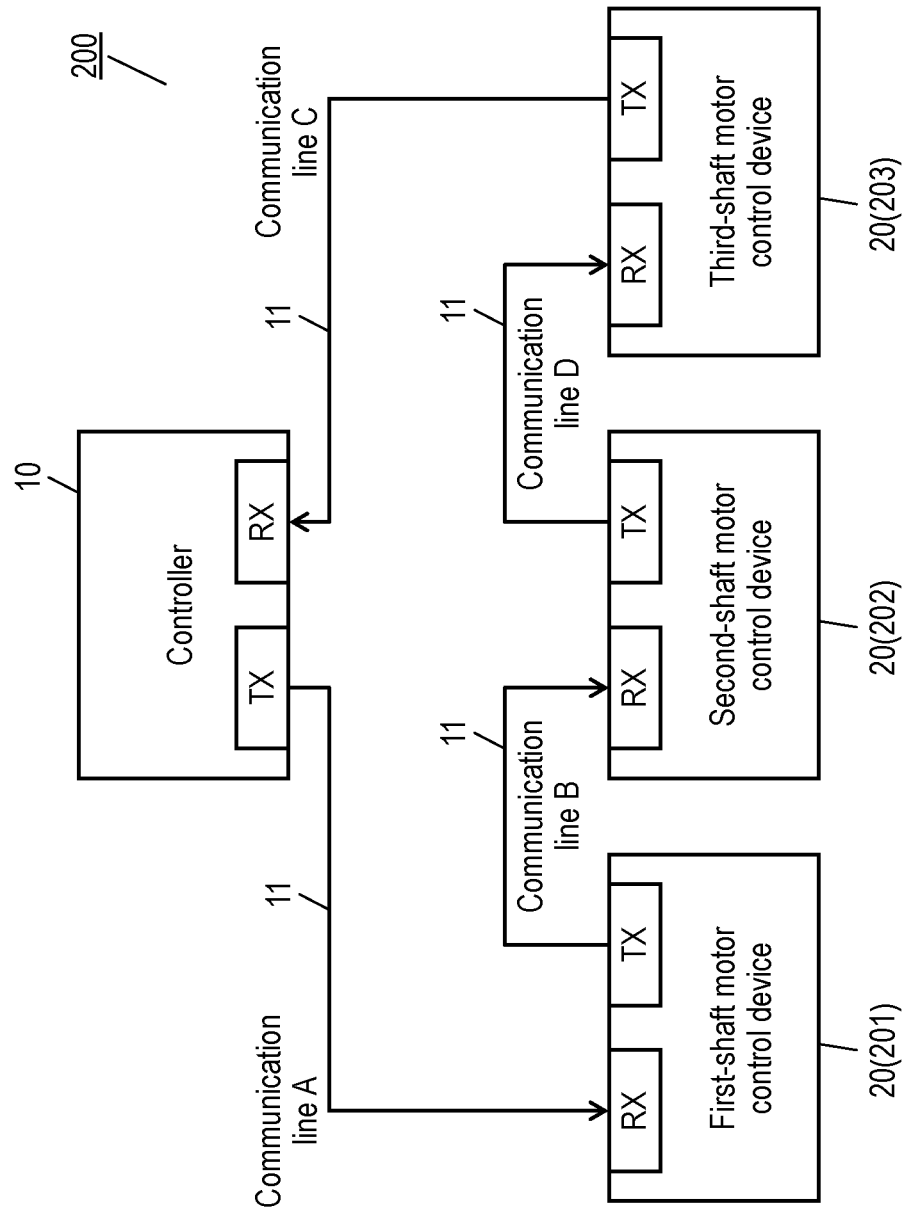
FIG. 8 is a block diagram depicting a ring network configuration of a multiaxial motor control system for three shafts according to a second exemplary embodiment of the present invention.

FIG. 8 is a block diagram depicting a ring network configuration of multiaxial motor control system 200 for three shafts according to a second exemplary embodiment of the present invention. As depicted in FIG. 8, multiaxial motor control system 200 configures a triaxial motor control system including controller 10 and three motor control devices 20 connected to form a ring shape. Specifically, in the present exemplary embodiment, additional motor control device 20 is connected in series between two motor control devices 20 depicted in FIG. 1. Controller 10 and motor control devices 20 are each configured as in internal configurations depicted in FIG. 4 and FIG. 5. A portion identical or corresponding to a portion according to the first exemplary embodiment will be denoted by an identical reference mark and will not be described partially.

In the triaxial configuration according to the present exemplary embodiment as depicted in FIG. 8, second-shaft motor control device 202 and third-shaft motor control device 203 have network connection via communication line 11 specified as communication line D, and third-shaft motor control device 203 and controller 10 have network connection via communication line 11 specified as communication line C.

Multiaxial motor control system 200 thus configured will be described next in terms of operation and effects.

Figure 9B:
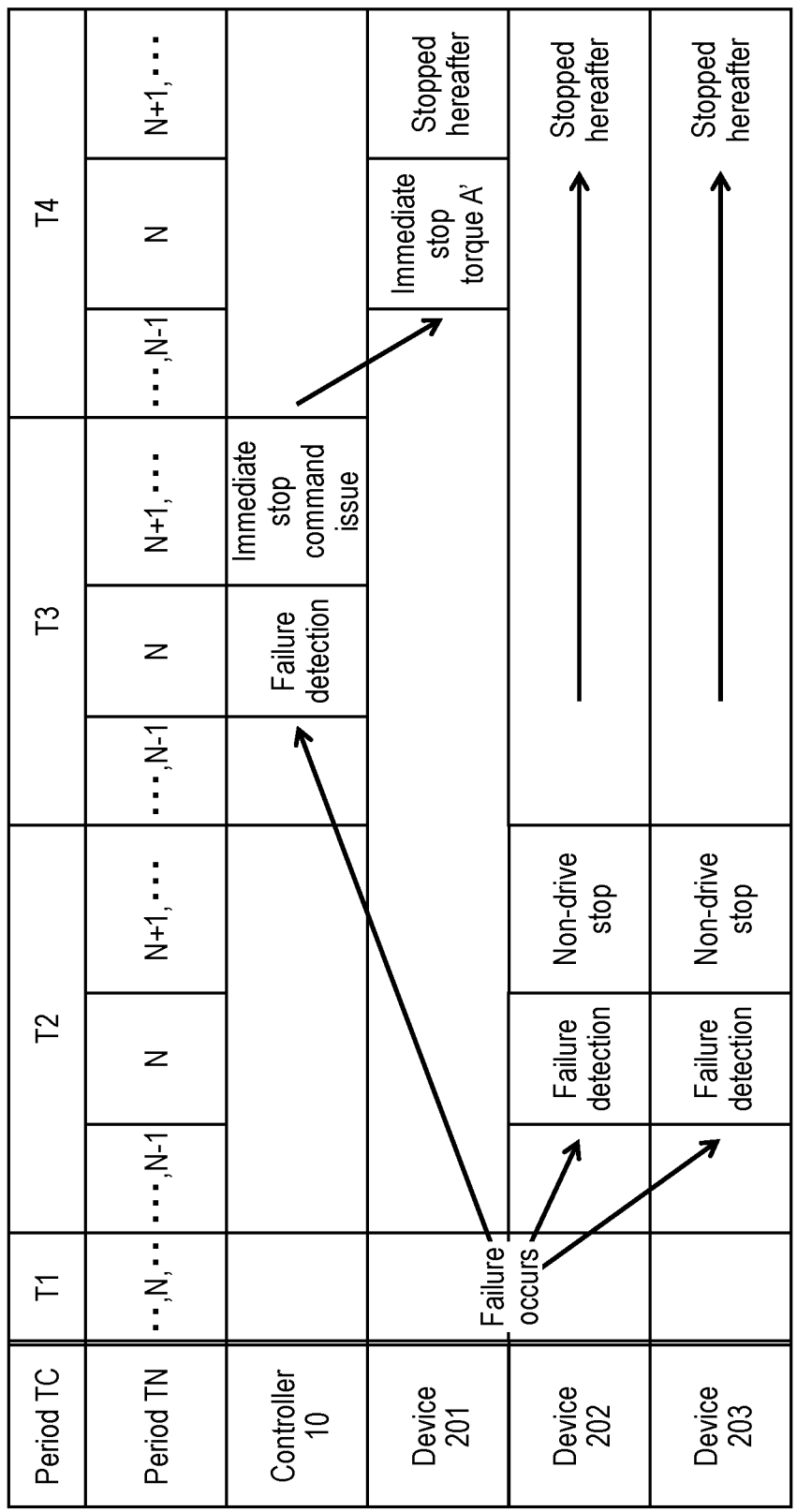
FIG. 9B is a chart of exemplary operation of each unit in this multiaxial motor control system, in a case where communication between the first-shaft motor control device and a second-shaft motor control device is interrupted.

FIG. 9A, FIG. 9B, FIG. 9C, and FIG. 9D (hereinafter, mentioned as FIG. 9A to FIG. 9D where appropriate) each indicate chronological operation of controller 10 and motor control devices 20 in a case where multiaxial motor control system 200 for three shafts depicted in FIG. 8 has communication failure as described in the first exemplary embodiment. FIG. 9A indicates exemplary operation of each unit in a case where communication between controller 10 and first-shaft motor control device 201 is interrupted. FIG. 9B indicates exemplary operation of each unit in a case where communication between first-shaft motor control device 201 and second-shaft motor control device 202 is interrupted. FIG. 9C indicates exemplary operation of each unit in a case where communication between second-shaft motor control device 202 and third-shaft motor control device 203 is interrupted. FIG. 9D indicates exemplary operation of each unit in a case where communication between third-shaft motor control device 203 and controller 10 is interrupted. For better comprehension of operation according to the present exemplary embodiment, FIG. 9A to FIG. 9D each indicate mainly operation of controller 10 and motor control devices 20 relevant to the emergency stop of motors 30 upon detection of communication failure. As in the first exemplary embodiment, hereinafter, the motor control devices will be specified appropriately by being identified as device 201, device 202, and device 203, while each of the motor control devices will generically be called motor control device 20.

(Exemplary Operation 2A)

Operation of each unit in a case where communication between controller 10 and first-shaft motor control device 201 is interrupted in the configuration depicted in FIG. 8 will be described initially as exemplary operation 2A.

As FIG. 9A indicates "failure occurs", communication between controller 10 and device 201 is interrupted during period TC=T1, due to break or the like of communication line A, or failure in communication function or the like of device 201 itself.

In response to such a fact that "failure occurs", communication controller 14 in each of device 201, device 202, and device 203 subsequently detects communication failure during period TN=N in period TC=T2.

Because the communication failure is detected in each motor control device 20, each motor control device 20 switches from operation according to a command received from controller 10 to operation according to individual control for the own device, subsequently during period TN=N+1 in period TC=T2. Device 201 executes immediate stop as indicated in FIG. 9A, in accordance with braking torque command Tb having braking torque value A' preset in torque amount storage 44 in rotation controller 24. Specifically, in device 201, communication controller 14 outputs stop command Em1 indicating activation of the immediate stop, and rotation controller 24 executes the immediate stop function. Stop commands Em2 and Em3 indicate deactivation in this case.

Meanwhile, as indicated in FIG. 9A, device 202 and device 203 each execute non-drive stop during period TN=N+1 in period TC=T2. Specifically, in each of device 202 and device 203, communication controller 14 outputs stop command Em2 indicating activation of the non-drive stop, and drive unit 25 executes the non-drive stop function. For execution of the non-drive stop, it is more preferred that communication controller 14 outputs stop command Em3 indicating activation of DB stop, to activate DB circuit 26 and apply the DB stop through dynamic braking.

Braking torque value A' for the immediate stop in exemplary operation 2A is preferably equal in amount to allowable maximum torque of multiaxial motor control system 200. The maximum torque value is set to minimize a stop distance of each of a plurality of drive shafts. Although torque less than the maximum torque leads to a longer stop distance, the torque amount can be determined in consideration of a stop position error between the plurality of shafts, heat generation by the DB circuits, and the like, to be necessary and sufficient.

Exemplary operation 2A does not adopt the conventional technique of immediately disconnecting electrification to every motor 30 for the non-drive stop when communication failure occurs between controller 10 and device 201, but includes application of braking torque by the immediate stop function while at least one motor 30 keeps being electrified. Execution of failure handling operation according to exemplary operation 2A enables motors 30 for the plurality of shafts to stop quickly and safely.

Subsequently during period TC=T3, controller 10 detects communication failure and issues an immediate stop command for every motor 30. However, communication between controller 10 and device 201 has failure. A command signal from controller 10 obviously fails to reach each of devices 201, 202, and 203 to be disregarded. Even if communication is recovered to a normal condition during period TC=T3, devices 201, 202, and 203 are already stopped and the immediate stop command is thus disregarded in exemplary operation 2A.

As described above with reference to exemplary operation 2A, multiaxial motor control system 200 according to the present exemplary embodiment is configured such that each of device 202 and device 203 having detected failure disconnects electrification to motor 30, and device 201 not disconnecting electrification outputs drive voltage Vd according to braking torque command Tb preset in rotation controller 24, so as to stop motors 30.

In multiaxial motor control system 200 thus configured, as in exemplary operation 1A, stress applied to load 36 can be decreased in comparison to operation of immediately stopping both shaft X1 and shaft X2 in FIG. 4. Furthermore, at least one of the shafts stops immediately and can thus needs a shorter stop distance and shorter stop time in comparison to operation of naturally stopping all the shafts.

The present exemplary embodiment exemplifies the case where there are provided the three motor control devices. In a case where there are provided motor control devices for a plurality of shafts, the following configuration will be applicable. Specifically, when at least one motor control device detects failure in reception of a command signal, the at least one motor control device having detected the failure disconnects electrification to the motor. At least one of the motor control devices not disconnecting electrification to the motor outputs a torque command for braking torque preset in the rotation controller to stop the motor. Such a configuration achieves similar effects.

(Exemplary Operation 2B)

Operation of each unit in a case where communication between device 201 and device 202 is interrupted will be described next as exemplary operation 2B.

As FIG. 9B indicates "failure occurs", communication between device 201 and device 202 is interrupted during period TC=T1, due to break or the like of communication line B, or failure in communication function or the like of device 202 itself.

Subsequently during period TN=N in period TC=T2, communication controller 14 in device 201 normally receives a command from controller 10, and device 201 executes ordinary operation. Meanwhile, communication controller 14 in each of device 202 and device 203 detects communication failure in response to the fact that "failure occurs".

Because the communication failure is detected in each of device 202 and device 203, device 202 and device 203 each switch from operation according to a command received from controller 10 to operation according to individual control for the own device to execute the non-drive stop, subsequently during period TN=N+1 in period TC=T2. Specifically, in each of device 202 and device 203, communication controller 14 outputs stop command Em2 indicating activation of the non-drive stop, and drive unit 25 executes the non-drive stop function. For execution of the non-drive stop, similarly to the above, it is more preferred to activate DB circuit 26 and apply the DB stop through dynamic braking.

Subsequently during period TC=T3, controller 10 detects communication failure and issues an immediate stop command for every motor 30. In this case, device 201 continues the ordinary operation whereas device 202 and device 203 are kept in the non-drive stop state.

Subsequently during period TC=T4, a command signal issued from controller 10 for the immediate stop command to every motor 30 is received by device 201, and device 201 executes immediate stop at braking torque value A. In this case, communication controller 14 in device 201 transmits stop command Em1 to rotation controller 24 or the like in accordance with the immediate stop command from controller 10. Torque processor 46 in device 201 then reads braking torque command Tb having braking torque value A' from torque amount storage 44. The immediate stop function is executed in device 201 in this manner. In contrast, the command signal from controller 10 is obviously not received by device 202 and device 203 to be disregarded, and device 202 and device 203 are kept in the non-drive stop state.

Braking torque value A for the immediate stop in exemplary operation 2B is preferably equal in amount to allowable maximum torque of multiaxial motor control system 200. The maximum torque is set to minimize the stop distance of each of the drive shafts. Although torque less than the maximum torque leads to a longer stop distance, the torque amount can be determined in consideration of a stop position error between the plurality of shafts, heat generation by the DB circuits, and the like, to be necessary and sufficient.

Exemplary operation 2B does not adopt the conventional technique of immediately disconnecting electrification to every motor 30 for the non-drive stop when communication failure occurs between device 201 and device 202, but includes application of braking torque by the immediate stop function while at least one motor 30 keeps being electrified. Execution of failure handling operation according to exemplary operation 2B enables motors 30 for the plurality of shafts to stop quickly and safely.

As described above with reference to exemplary operation 2B, multiaxial motor control system 200 according to the present exemplary embodiment is configured such that each of device 202 and device 203 having detected failure disconnects electrification to motor 30, and device 201 not disconnecting electrification outputs drive voltage Vd corresponding to braking torque command Tb according to a command signal received normally from controller 10, so as to stop motors 30.

Multiaxial motor control system 200 is also configured as described above and thus executes the procedure obtained by combining the immediate stop function and the non-drive stop function during failure, as in exemplary operation 1B. Stress applied to load 36 can thus be decreased in comparison to operation of immediately stopping both shaft X1 and shaft X2 in FIG. 4. Furthermore, one of the shafts stops immediately and can thus needs a shorter stop distance and shorter stop time in comparison to operation of naturally stopping all the shafts.

The present exemplary embodiment exemplifies the case where there are provided the two motor control devices. In a case where there are provided motor control devices for a plurality of shafts, the following configuration will be applicable. Specifically, when at least one motor control device detects failure in reception of a command signal, the at least one motor control device having detected the failure disconnects electrification to the motor. When at least one of the motor control devices not cancelling electrification to the motor outputs a torque command for braking torque according to a command signal received normally from the controller to stop the motor. Such a configuration achieves similar effects.

(Exemplary Operation 2C)

Operation of each unit in a case where communication between device 202 and device 203 is interrupted will be described next as exemplary operation 2C.

As FIG. 9C indicates "failure occurs", communication between device 202 and device 203 is interrupted during period TC=T1, due to break or the like of communication line D, or failure in communication function or the like of device 203 itself.

Subsequently during period TN=N in period TC=T2, communication controller 14 in each of device 201 and device 202 normally receives a command from controller 10, and device 201 and device 202 execute the ordinary operation. Meanwhile, communication controller 14 in device 203 detects communication failure in response to the fact that "failure occurs".

Because the communication failure is detected in device 203, device 203 switches from operation according to a command received from controller 10 to operation according to individual control for the own device to execute the non-drive stop, subsequently during period TN=N+1 in period TC=T2. Specifically, in device 203, communication controller 14 outputs stop command Em2 indicating activation of the non-drive stop, and drive unit 25 executes the non-drive stop function. For execution of the non-drive stop, similarly to the above, it is more preferred to apply the DB stop through dynamic braking.

Subsequently during period TC=T3, controller 10 detects communication failure and issues an immediate stop command for every motor 30. In this case, device 201 and device 202 continue the ordinary operation whereas device 203 is kept in the non-drive stop state.

Subsequently during period TC=T4, a command signal issued from controller 10 for the immediate stop command to every motor 30 is received by each of device 201 and device 202, and device 201 and device 202 each execute the immediate stop at braking torque value C. In this case, communication controller 14 in each of device 201 and device 202 transmits stop command Em1 to rotation controller 24 or the like in accordance with the immediate stop command from controller 10. Torque processor 46 in each of device 201 and device 202 then reads braking torque command Tb having braking torque value C from torque amount storage 44. The immediate stop function is executed in each of device 201 and device 202 in this manner. In contrast, the command signal from controller 10 is obviously not received by device 203 to be disregarded, and device 203 is kept in the non-drive stop state.

Braking torque value C for the immediate stop in exemplary operation 2C preferably has an amount obtained through dividing allowable maximum torque of multiaxial motor control system 200 by a number of shafts (two in the present practical example) to be immediately stopped. The two shafts are immediately stopped in the present exemplary operation, so that braking torque value C preferably has an amount obtained through dividing the maximum torque by two as the number of the shafts. In other words, braking torque value C corresponds to a half of braking torque A' mentioned above. Furthermore, two amounts of torque are more preferred to match each other to be an identical amount, so as to minimize the stop distances of the plurality of drive shafts. Although torque less than the maximum torque leads to a longer stop distance, the torque amount can be determined in consideration of a stop position error between the plurality of shafts, heat generation by the DB circuits, and the like, to be necessary and sufficient. Specifically, braking torque can be set for each of the motor control devices such that a sum of the braking torque output from all the motor control devices is equal to or less than allowable maximum braking torque of the present multiaxial motor control system.

Exemplary operation 2C does not adopt the conventional technique of immediately disconnecting electrification to every motor 30 for the non-drive stop when communication failure occurs between device 202 and device 203, but includes application of braking torque by the immediate stop function while at least one motor 30 keeps being electrified. Execution of failure handling operation according to exemplary operation 2C enables motors 30 for the plurality of shafts to stop quickly and safely.

As described above with reference to exemplary operation 2C, multiaxial motor control system 200 according to the present exemplary embodiment is configured such that device 203 having detected failure disconnects electrification to motor 30, and each of device 201 device 202 not disconnecting electrification outputs drive voltage Vd corresponding to braking torque command Tb according to a command signal received normally from controller 10, so as to stop motors 30.

Multiaxial motor control system 200 is also configured as described above and thus executes the procedure obtained by combining the immediate stop function and the non-drive stop function during failure, as in exemplary operation 1B and exemplary operation 2B. Stress applied to load 36 can thus be decreased in comparison to operation of immediately stopping both shaft X1 and shaft X2 in FIG. 4. Furthermore, at least one of the shafts stops immediately and can thus needs a shorter stop distance and shorter stop time in comparison to operation of naturally stopping all the shafts.

The present exemplary embodiment exemplifies the case where there are provided the three motor control devices. In a case where there are provided motor control devices for a plurality of shafts, the following configuration will be applicable. Specifically, when at least one motor control device detects failure in reception of a command signal, the at least one motor control device having detected the failure disconnects electrification to the motor. When at least one of the motor control devices not cancelling electrification to the motor outputs a torque command for braking torque according to a command signal received normally from the controller to stop the motor. Such a configuration achieves similar effects.

(Exemplary Operation 2D)

Operation of each unit in a case where communication between device 203 and controller 10 is interrupted will be described next as exemplary operation 2D. Exemplary operation 2D relates only to multiaxial motor control system 200 having ring connection.

As FIG. 9D indicates "failure occurs", communication between device 203 and controller 10 is interrupted during period TC=T1, due to break or the like of communication line C, or failure in communication function or the like of controller 10 itself.

Subsequently during period TN=N in period TC=T2, controller 10 detects communication failure and issues an immediate stop command for every motor 30. motor control devices 20 continue the ordinary operation.

Subsequently during period TC=T3, motor control devices 20 each execute the immediate stop at braking torque value B' in accordance with the command received from controller 10. Braking torque value B' for the immediate stop in exemplary operation 2D preferably has an amount obtained through dividing allowable maximum torque of multiaxial motor control system 200 by the number of shafts to be immediately stopped. The three shafts are immediately stopped in the present exemplary operation, so that braking torque value B' preferably has an amount obtained through dividing the maximum torque by three as the number of the shafts. In other words, braking torque value B' corresponds to one third of braking torque A mentioned above. Furthermore, three amounts of torque are more preferred to match one another to be an identical amount, so as to minimize the stop distances of the plurality of drive shafts. In consideration of safety and the like, braking torque can be set for each motor control device 20 such that a sum of the braking torque output from all motor control devices 20 is equal to or less than allowable maximum braking torque of multiaxial motor control system 200.

Exemplary operation 2D also does not adopt the conventional technique of immediately disconnecting electrification to every motor 30 for the non-drive stop when communication failure occurs between device 203 and controller 10, but includes application of braking torque such that the maximum braking torque is dispersed to the respective shafts while every motor 30 keeps being electrified. Execution of failure handling operation according to exemplary operation 2D enables motors 30 for the plurality of shafts to stop quickly and safely.

As described above with reference to exemplary operation 2D, multiaxial motor control system 200 according to the present exemplary embodiment is configured such that, when controller 10 detects failure in reception of a response signal from device 203 to a command signal, all of device 201, device 202, and device 203 each output braking torque according to the command signal from controller 10 to stop motor 30.

Similarly to ring multiaxial motor control system 200 described above, a triaxial motor control system (not depicted) having line connection can be configured such that the configuration depicted in FIG. 2 is applied with difference between the biaxial motor control system having ring connection depicted in FIG. 1 and the triaxial motor control system having ring connection depicted in FIG. 7. The configuration described with reference to each of exemplary operation 2A to exemplary operation 2D is also applicable to such a line configuration.

A method of emergently stopping motors 30 adopted for multiaxial motor control system 100, 200 for two or three shafts described above is applicable also to a multiaxial motor control system for four or more shafts corresponding to motors 30 and controlled synchronously. Addition of one motor control device 20 corresponding to second-shaft motor control device 202 added for increase from the two shafts to the three shafts is required every time one shaft is added. Added motor control device 20 needs to be configured to execute immediate stop, non-drive stop, or immediate stop after elapse of predetermined time from the end of continuous operation, similarly to adjacent motor control devices 20.

Third Exemplary Embodiment

Figure 10:
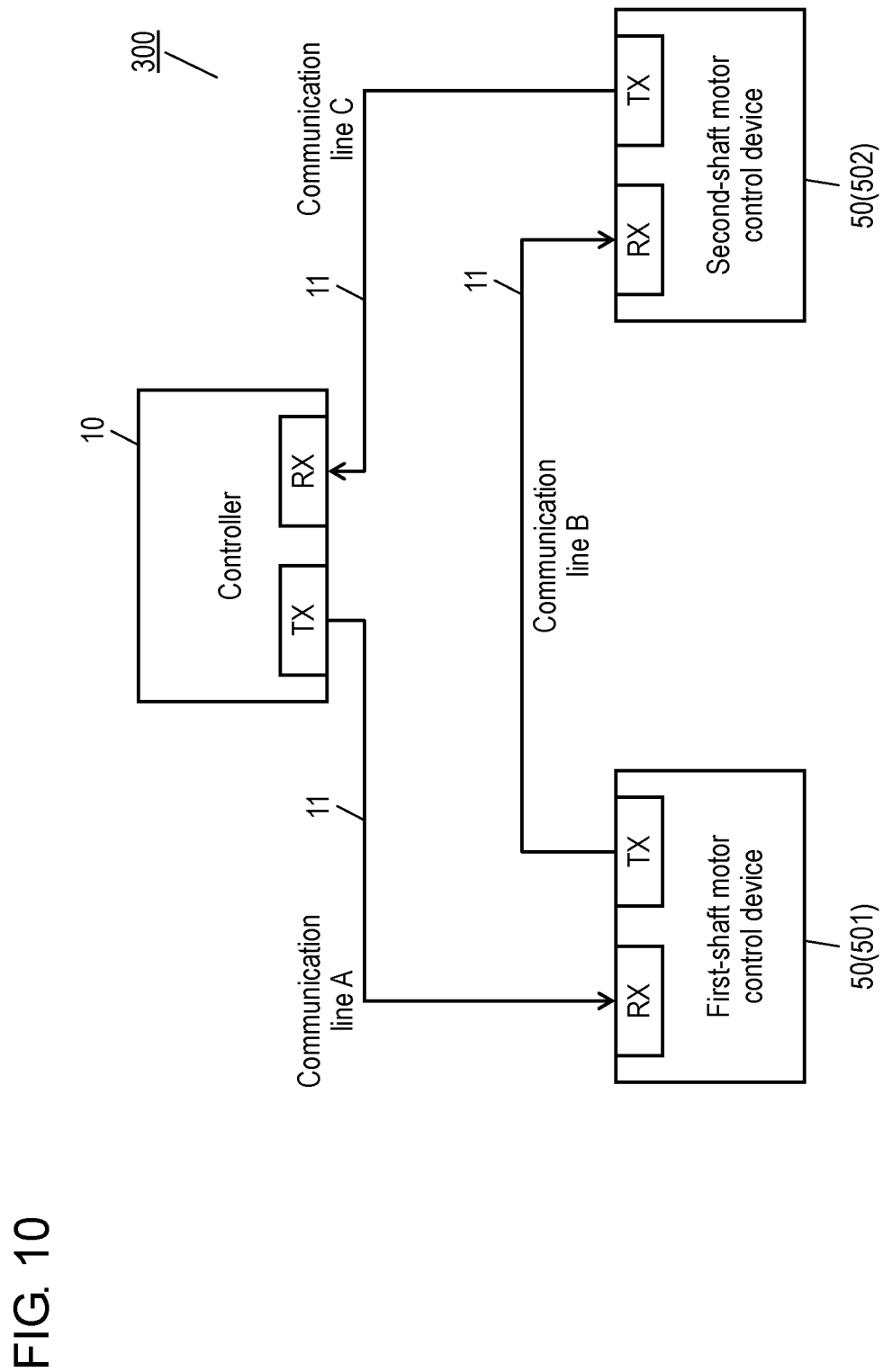
FIG. 10 is a block diagram depicting a ring network configuration of a multiaxial motor control system for two shafts, having ring connection, according to a third exemplary embodiment of the present invention.
Figure 11:
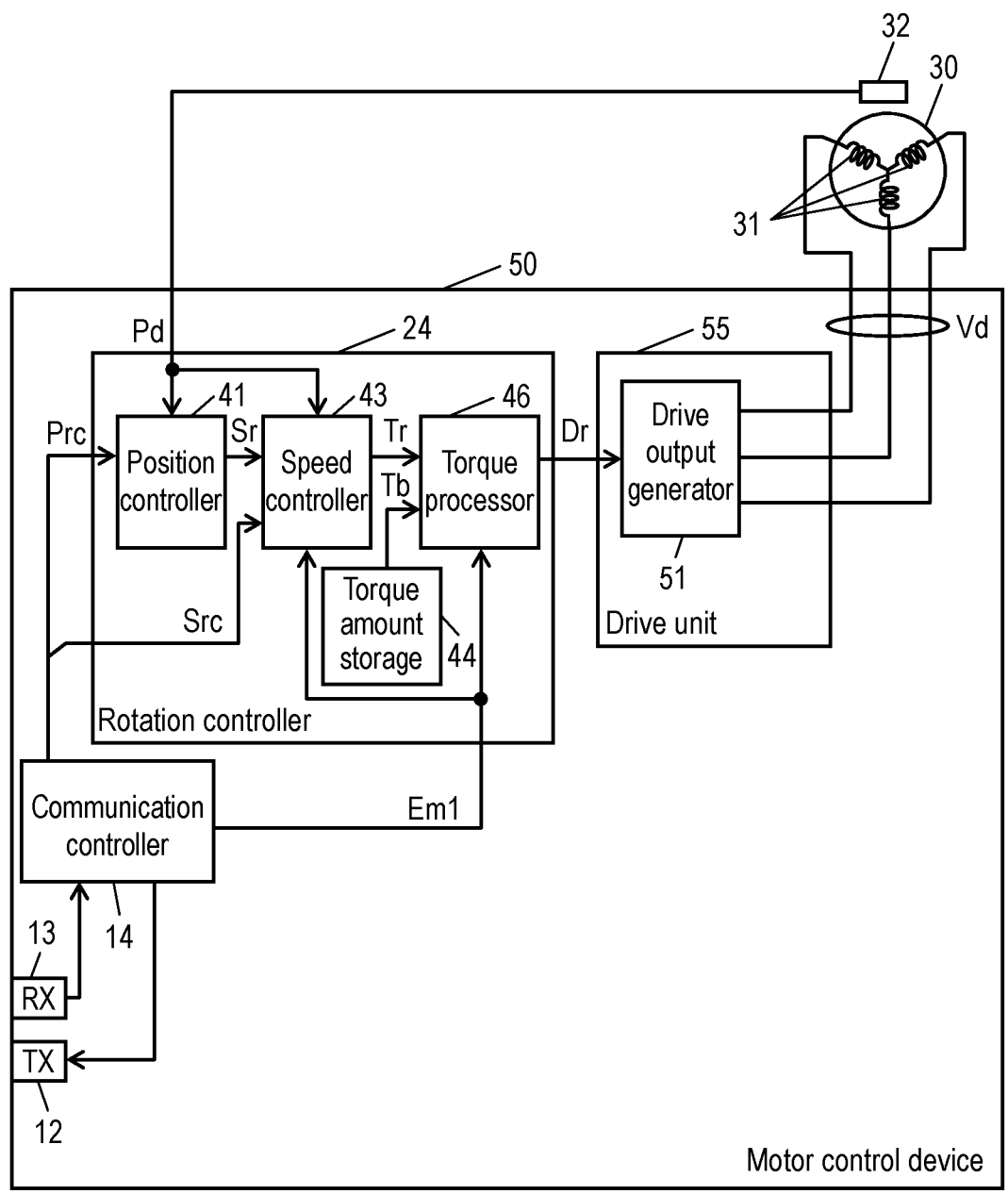
FIG. 11 is a block diagram depicting a detailed exemplary configuration of a motor control device according to the third exemplary embodiment of the present invention.

FIG. 10 is a block diagram depicting a ring network configuration of multiaxial motor control system 300 for two shafts, having ring connection, according to a third exemplary embodiment of the present invention. FIG. 11 is a block diagram depicting a detailed exemplary configuration of motor control device 50 according to the third exemplary embodiment of the present invention. As depicted in FIG. 10, multiaxial motor control system 300 configures a triaxial motor control system including controller 10 and two motor control devices 50 connected to form a ring shape. In comparison to the first exemplary embodiment, multiaxial motor control system 300 according to the present exemplary embodiment includes motor control devices 50 in place of motor control devices 20 of the first exemplary embodiment.

Motor control devices 20 according to the first exemplary embodiment are each configured to selectively adopt the above three functions for stop of driving the motor upon detection of communication failure. In contrast, motor control devices 50 according to the present exemplary embodiment are each configured to stop driving the motor by adopting only the immediate stop function. Communication controller 14 thus notifies rotation controller 24 of only stop command Em1. Each motor control device 50 does not include any DB circuit, and drive unit 55 in motor control device 50 includes only drive output generator 51. A constituent element same as a constituent element according to the first exemplary embodiment will be denoted by an identical reference mark and will not be described in detail repeatedly.

Multiaxial motor control system 300 thus configured will be described next in terms of operation and effects.

Figure 12A:
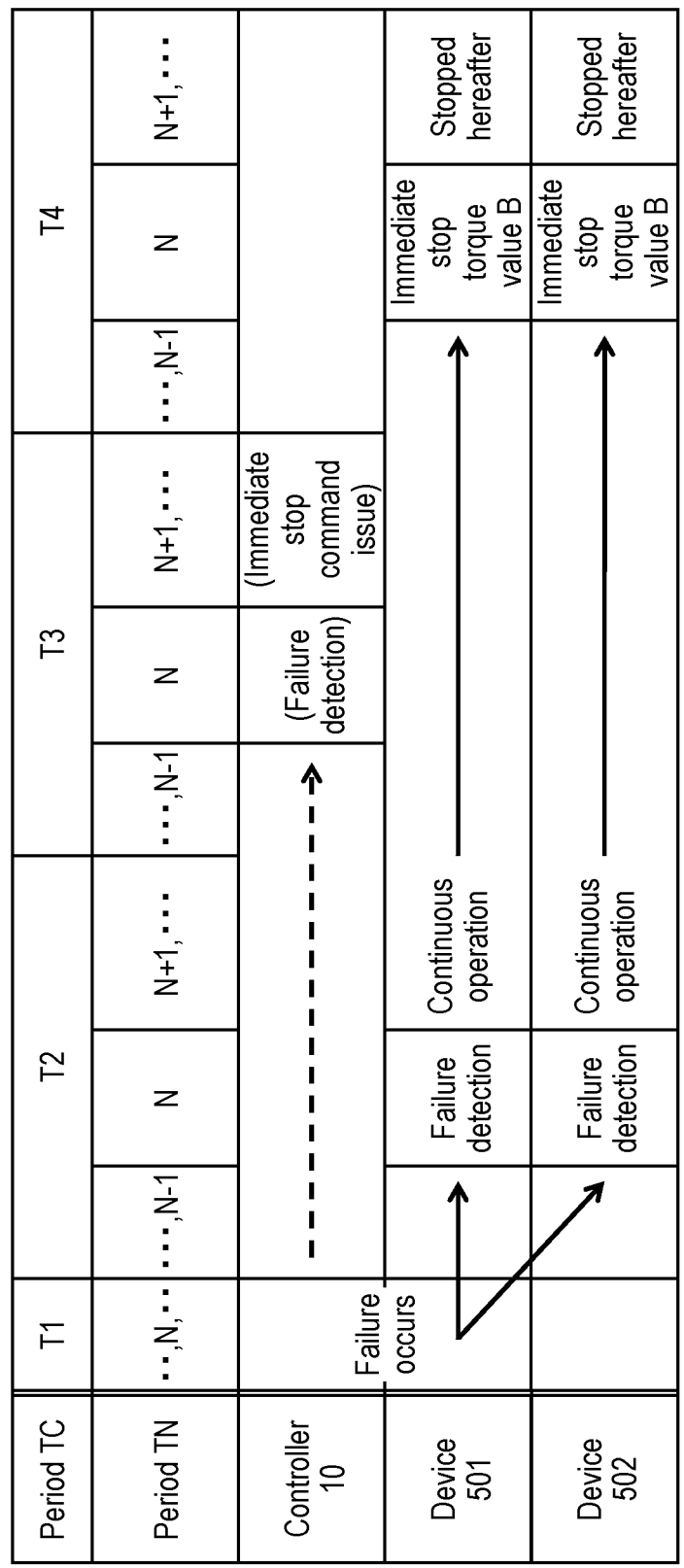
FIG. 12A is a chart of exemplary operation of each unit in the multiaxial motor control system according to the third exemplary embodiment of the present invention, in a case where communication between a controller and a first-shaft motor control device is interrupted.
Figure 12B:
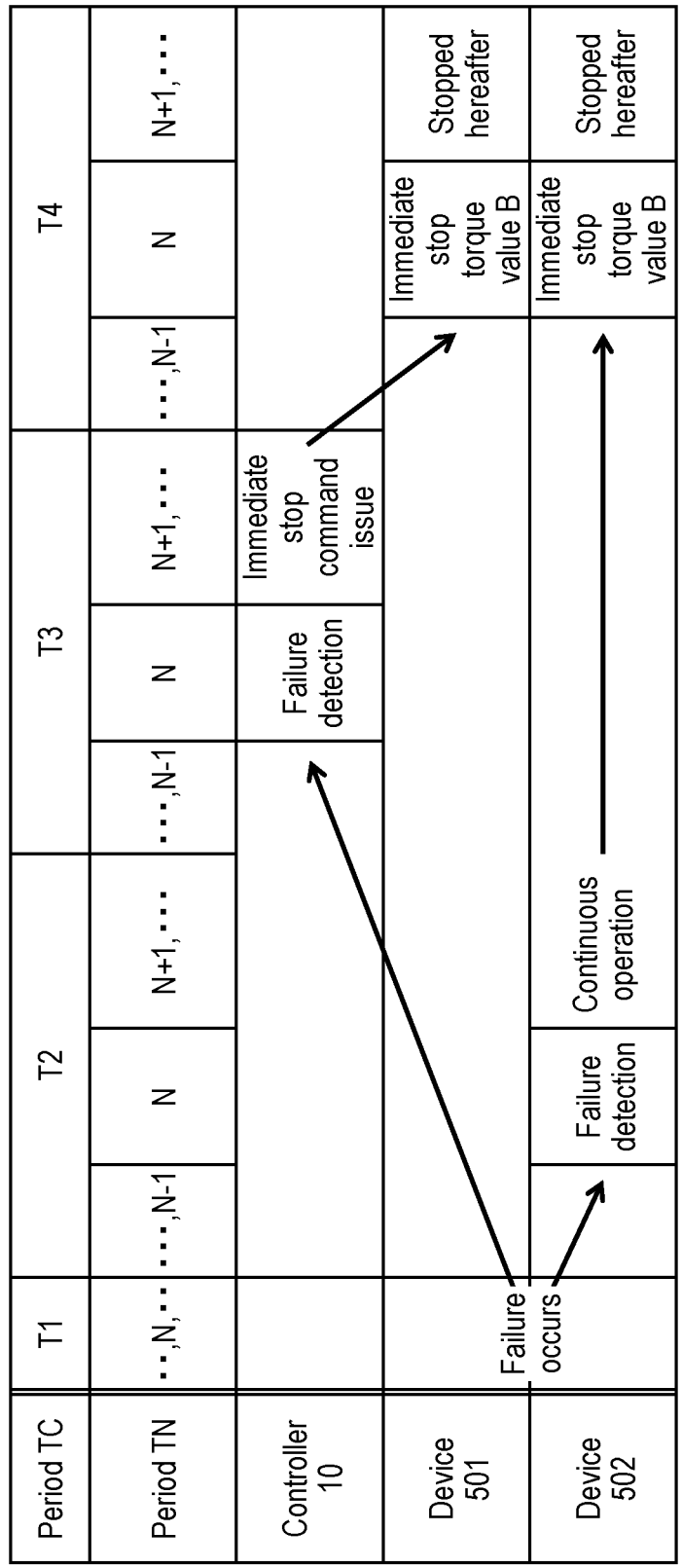
FIG. 12B is a chart of exemplary operation of each unit in this multiaxial motor control system, in a case where communication between the first-shaft motor control device and a second-shaft motor control device is interrupted.

FIG. 12A and FIG. 12B (hereinafter, mentioned as FIG. 12A to FIG. 12B where appropriate) each indicate chronological operation of controller 10 and motor control devices 50 in a case where multiaxial motor control system 300 for two shafts depicted in FIG. 10 has communication failure as described in the first exemplary embodiment. FIG. 12A indicates exemplary operation of each unit in a case where communication between controller 10 and first-shaft motor control device 501 is interrupted. FIG. 12B indicates exemplary operation of each unit in a case where communication between first-shaft motor control device 501 and second-shaft motor control device 502 is interrupted. Operation during communication interruption between second-shaft motor control device 502 and controller 10 is similar to exemplary operation 1C described with reference to FIG. 6C in the first exemplary embodiment, and will not be described in detail repeatedly. For better comprehension of operation according to the present exemplary embodiment, FIG. 12A to FIG. 12B each indicate mainly operation of controller 10 and motor control devices 50 relevant to emergency stop of motors 30 upon detection of communication failure. As in the first exemplary embodiment, hereinafter, the motor control devices will be specified appropriately by being identified as device 501 and device 502, while each of the motor control devices will generically be called motor control device 50.

(Exemplary Operation 3A)

Operation of each unit in a case where communication between controller 10 and first-shaft motor control device 501 is interrupted will be described initially as exemplary operation 3A.

As FIG. 12A indicates "failure occurs", communication between controller 10 and device 501 is interrupted during period TC=T1 as in exemplary operation 1A, due to break or the like of communication line A, or failure in communication function or the like of device 501 itself.

Subsequently during period TN=N in period TC=T2, communication controller 14 in each of device 501 and device 502 detects communication failure.

Although the communication failure is detected at this timing, in exemplary operation 3A, device 501 and device 502 subsequently each execute operation with switching to individual control for the own device in accordance with the latest command from controller 10 received most recently in the normal communication state (hereinafter, called continuous operation). The continuous operation is executed for time to be described later.

Meanwhile, controller 10 detects communication failure and issues an immediate stop command for every motor 30 during period TC=T3. However, communication between controller 10 and device 501 has failure. A command signal from controller 10 obviously fails to reach each of device 501 and device 502. As described above, device 501 and device 502 each execute the continuous operation in accordance with individual control for the own device in this case.

The time for the continuous operation is preset in device 501 and device 502. The time for the continuous operation is set in consideration of period TC and period TN required due to speed of communication among controller 10, device 501, and device 502, processing speed of controller 10, and the like. Furthermore, the signal from controller 10 for the immediate stop command will not reach each of device 501 and device 502 as described above.

The execution time for the continuous operation is determined on the assumption that a command issued by controller 10 during period TC=T3 can be received normally by each of device 501 and device 502 during period TC=T4. The time for the continuous operation on this assumption lasts from start of the continuous operation until each of device 501 and device 502 receives a command signal and executes immediate stop. Motor control devices 50 according to the present exemplary embodiment each have preset time from start of the continuous operation until motor control device 50 outputs braking torque set in rotation controller 24 and motor 30 stops as predetermined time for the continuous operation. This predetermined time is set to be equal to k (k is a natural number) times of command update period TC as the reference period for transmission of a command signal by controller 10.

After the time for the continuous operation elapses, device 501 and device 502 each execute the immediate stop as indicated in FIG. 12A, not in accordance with a command received from controller 10 but in accordance with braking torque command Tb having braking torque value B preset in torque amount storage 44 in rotation controller 24. Specifically, in each of device 501 and device 502, communication controller 14 outputs stop command Em1 indicating activation of the immediate stop, and rotation controller 24 executes the immediate stop function. Braking torque value B for the immediate stop in exemplary operation 3A preferably has an amount obtained through dividing allowable maximum torque of multiaxial motor control system 300 by a number of shafts to be immediately stopped. The two shafts are immediately stopped in the present exemplary operation, so that braking torque value B preferably has an amount obtained through dividing the maximum torque by two as the number of the shafts. In other words, braking torque value B corresponds to a half of the maximum braking torque value. Furthermore, two amounts of torque are more preferred to match each other to be an identical amount, so as to minimize the stop distances of the plurality of drive shafts. In consideration of safety and the like, braking torque can be set for each of the motor control devices such that a sum of the braking torque output from all the motor control devices is equal to or less than allowable maximum braking torque of the present multiaxial motor control system.

Exemplary operation 3A also does not adopt the conventional technique of immediately disconnecting electrification to every motor 30 for non-drive stop when communication failure occurs between controller 10 and device 501, but includes application of braking torque such that the maximum braking torque is dispersed to the respective shafts while every motor 30 keeps being electrified. Execution of failure handling operation according to exemplary operation 3A enables motors 30 for the plurality of shafts to stop quickly and safely.

As described above with reference to exemplary operation 3A, in multiaxial motor control system 300 according to the present exemplary embodiment, each of device 501 and device 502 having detected failure outputs driving torque according to a command signal received normally before the failure detection to execute the continuous operation of the corresponding motor. After the predetermined time from start of the continuous operation, all of device 501 and device 502 for control of the plurality of shafts each output braking torque preset in the rotation controller to stop the corresponding motor.

The present exemplary embodiment exemplifies the case where there are provided the two motor control devices. In a case where there are provided motor control devices for a plurality of shafts, the following configuration will be applicable. In a case where at least one motor control device detects failure in reception of a command signal, the at least one motor control device having detected the failure outputs driving torque according to a command signal received normally before the detection of the failure to execute the continuous operation of the motor. After the predetermined time from start of the continuous operation, all of the motor control devices for control of the plurality of shafts each output braking torque preset in the rotation controller to stop the corresponding motor. Such a configuration achieves similar effects.

(Exemplary Operation 3B)

Operation of each unit in a case where communication between device 501 and device 502 is interrupted will be described next as exemplary operation 3B.

As FIG. 12B indicates "failure occurs", communication between device 501 and device 502 is interrupted during period TC=T1, due to break or the like of communication line B, or failure in communication function or the like of device 502 itself.

Subsequently during period TN=N in period TC=T2, communication controller 14 in device 501 normally receives a command from controller 10, and device 501 executes ordinary operation. Meanwhile, communication controller 14 in device 502 detects communication failure in response to the fact that "failure occurs".

Although the communication failure is detected at this timing, according to exemplary operation 3B, device 502 subsequently switches to individual control for the own device and executes the continuous operation. The continuous operation is executed for time to be described later.

Subsequently during period TC=T3, controller 10 detects communication failure and issues an immediate stop command for every motor 30. In this case, device 501 continues the ordinary operation whereas device 502 executes the continuous operation.

The time for the continuous operation is preset in device 502. The time for the continuous operation is set in consideration of period TC and period TN required due to speed of communication among controller 10, device 501, and device 502, processing speed of controller 10, and the like. Furthermore, the execution time for the continuous operation is determined on the assumption that a command issued by controller 10 during period TC=T3 can be received normally by each of device 501 and device 502 during period TC=T4. The time for the continuous operation on this assumption lasts from start of the continuous operation until each of device 501 and device 502 receives a command signal and executes the immediate stop. As in exemplary operation 3A, motor control devices 50 each have preset time from start of the continuous operation until motor control device 50 outputs braking torque set in rotation controller 24 and motor 30 stops as predetermined time for the continuous operation. This predetermined time is set to be equal to k (k is a natural number) times of command update period TC as the reference period for transmission of a command signal by controller 10.

After the time for the continuous operation elapses, device 501 executes the immediate stop at braking torque value B in accordance with the command received from controller 10. Meanwhile, device 502 executes the immediate stop not in accordance with a command received from controller 10, but in accordance with individual control for the own device in the continuous operation, at preset braking torque value B. Braking torque value B for the immediate stop in exemplary operation 3B preferably has an amount obtained through dividing allowable maximum torque of multiaxial motor control system 300 by the number of shafts to be immediately stopped. The two shafts are immediately stopped in the present exemplary operation, so that braking torque value B preferably has an amount obtained through dividing the maximum torque by two as the number of the shafts. In other words, braking torque value B corresponds to a half of the maximum braking torque value. Furthermore, two amounts of torque are more preferred to match each other to be an identical amount, so as to minimize the stop distances of the plurality of drive shafts. In consideration of safety and the like, braking torque can be set for each of the motor control devices such that a sum of the braking torque output from all the motor control devices is equal to or less than allowable maximum braking torque of the present multiaxial motor control system.

Exemplary operation 3B also does not adopt the conventional technique of immediately disconnecting electrification to every motor 30 for the non-drive stop when communication failure occurs between device 501 and device 502, but includes application of braking torque such that the maximum braking torque is dispersed to the respective shafts while every motor 30 keeps being electrified. Execution of failure handling operation according to exemplary operation 3B enables motors 30 for the plurality of shafts to stop quickly and safely.

As described above with reference to exemplary operation 3B, in multiaxial motor control system 300 according to the present exemplary embodiment, device 502 having detected failure outputs driving torque according to a command signal received normally before the failure detection to execute the continuous operation of motor 30. After predetermined time from start of the continuous operation, device 502 outputs braking torque preset in the rotation controller to stop the motor. In multiaxial motor control system 300 according to the present exemplary embodiment, device 501 not executing the continuous operation outputs braking torque according to a command signal received normally from controller 10 to stop the motor.

The present exemplary embodiment exemplifies the case where there are provided the two motor control devices. In a case where there are provided motor control devices for a plurality of shafts, the following configuration will be applicable. In a case where at least one motor control device detects failure in reception of a command signal, the at least one motor control device having detected the failure outputs driving torque according to a command signal received normally before the detection of the failure to execute the continuous operation of the motor. After the predetermined time from start of the continuous operation, at least one of the motor control devices having executed the continuous operation outputs braking torque preset in the torque controller to stop the motor. When at least one of the motor control devices not executing the continuous operation outputs braking torque according to a command signal received normally from the controller to stop the motor. Such a configuration achieves similar effects.

Fourth Exemplary Embodiment

Figure 13:
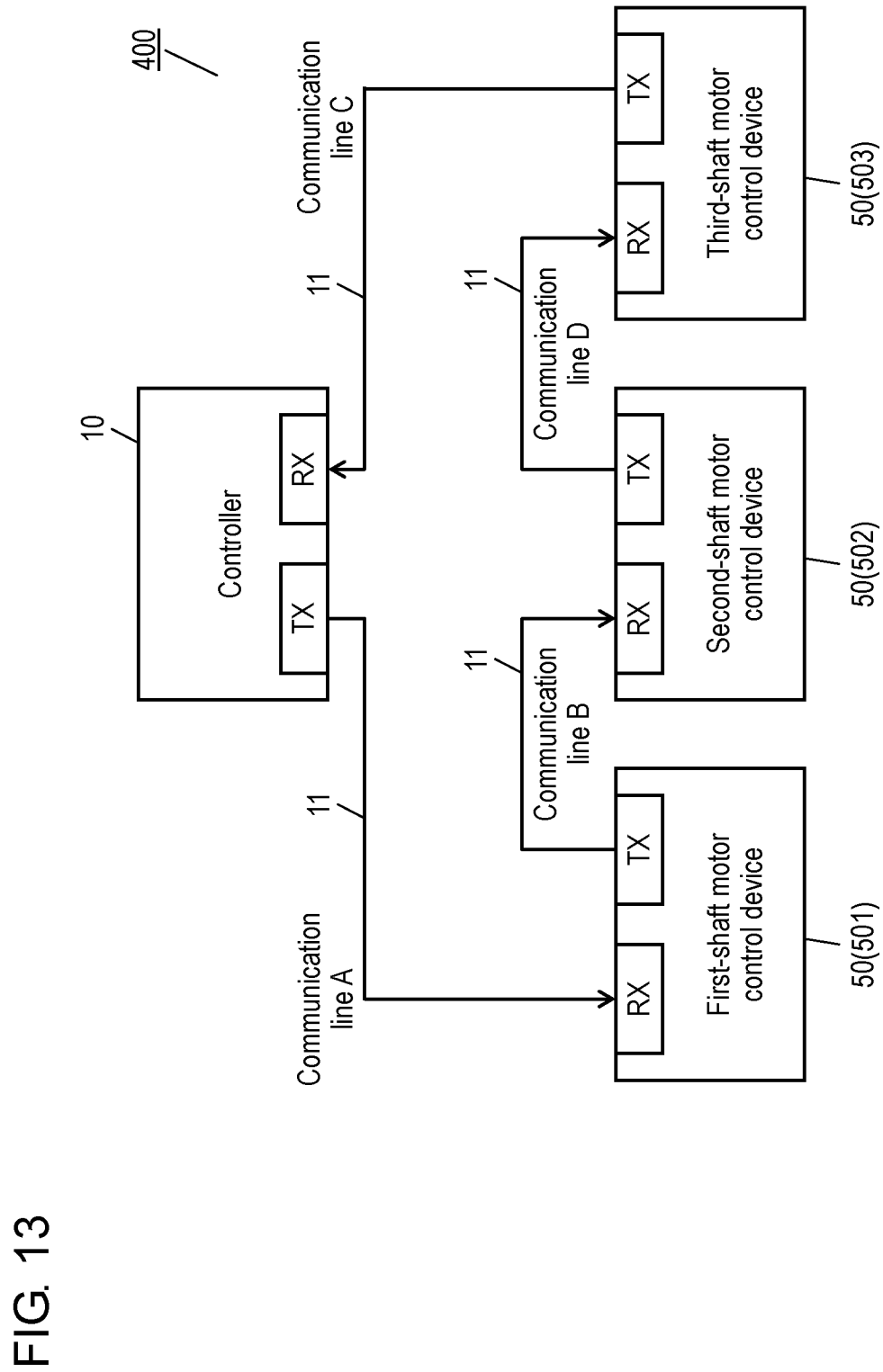
FIG. 13 is a block diagram depicting a ring network configuration of a multiaxial motor control system for three shafts according to a fourth exemplary embodiment of the present invention.

FIG. 13 is a block diagram depicting a ring network configuration of multiaxial motor control system 400 for three shafts according to a fourth exemplary embodiment of the present invention. As depicted in FIG. 13, multiaxial motor control system 400 configures a triaxial motor control system including controller 10 and three motor control devices 50 connected to form a ring shape. Specifically, according to the present exemplary embodiment, additional motor control device 50 is connected in series between two motor control devices 50 depicted in FIG. 10. Motor control devices 50 are each configured as in an internal configuration depicted in FIG. 11. A portion identical or corresponding to a portion according to the third exemplary embodiment will be denoted by an identical reference mark and will not be described partially.

In the triaxial configuration according to the present exemplary embodiment as depicted in FIG. 13, second-shaft motor control device 502 and third-shaft motor control device 503 have network connection via communication line 11 specified as communication line D, and third-shaft motor control device 503 and controller 10 have network connection via communication line 11 specified as communication line C.

Multiaxial motor control system 400 thus configured will be described next in terms of operation and effects.

Figure 14A:
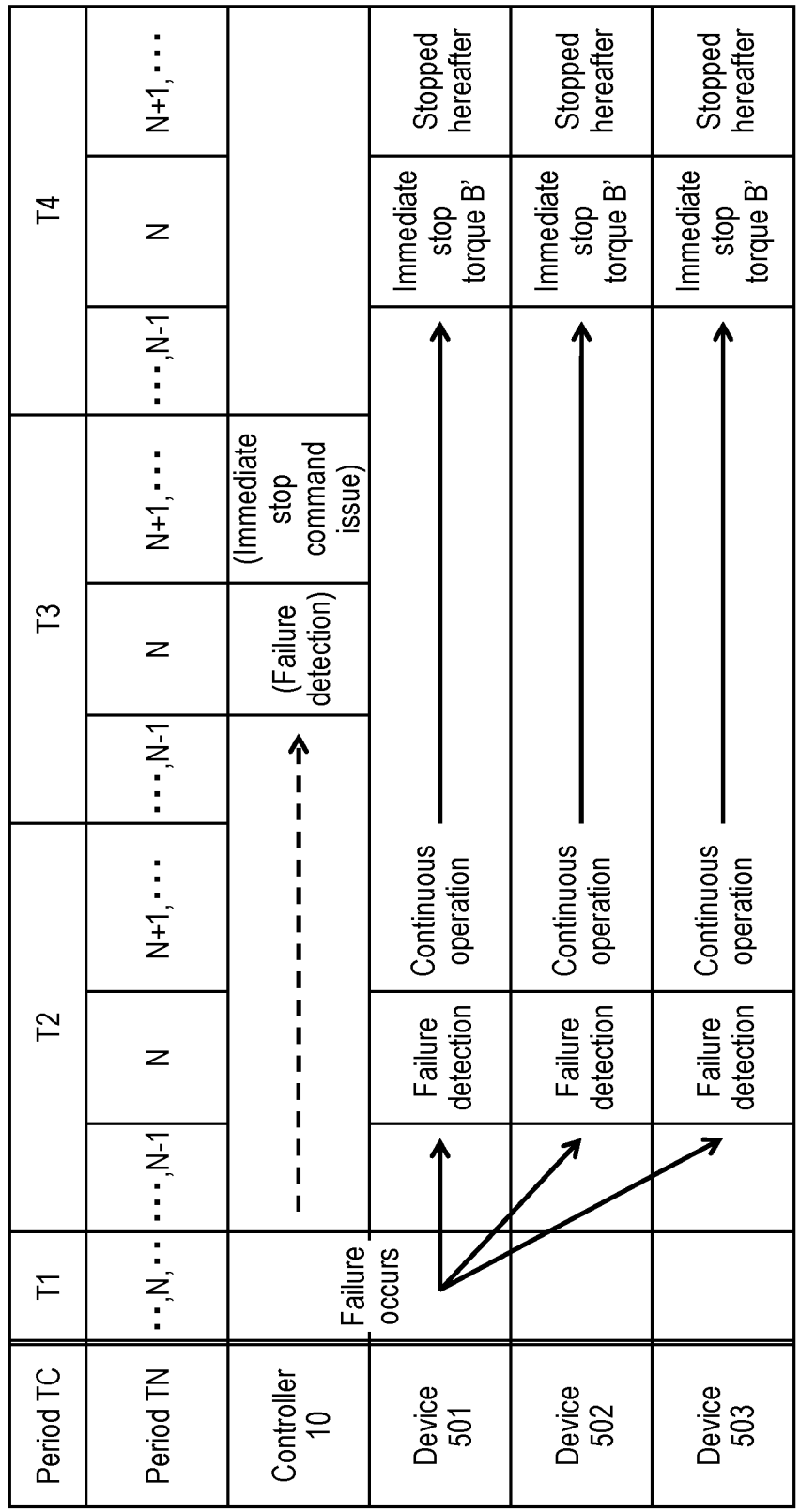
FIG. 14A is a chart of exemplary operation of each unit in the multiaxial motor control system according to the fourth exemplary embodiment of the present invention, in a case where communication between a controller and a first-shaft motor control device is interrupted.
Figure 14B:
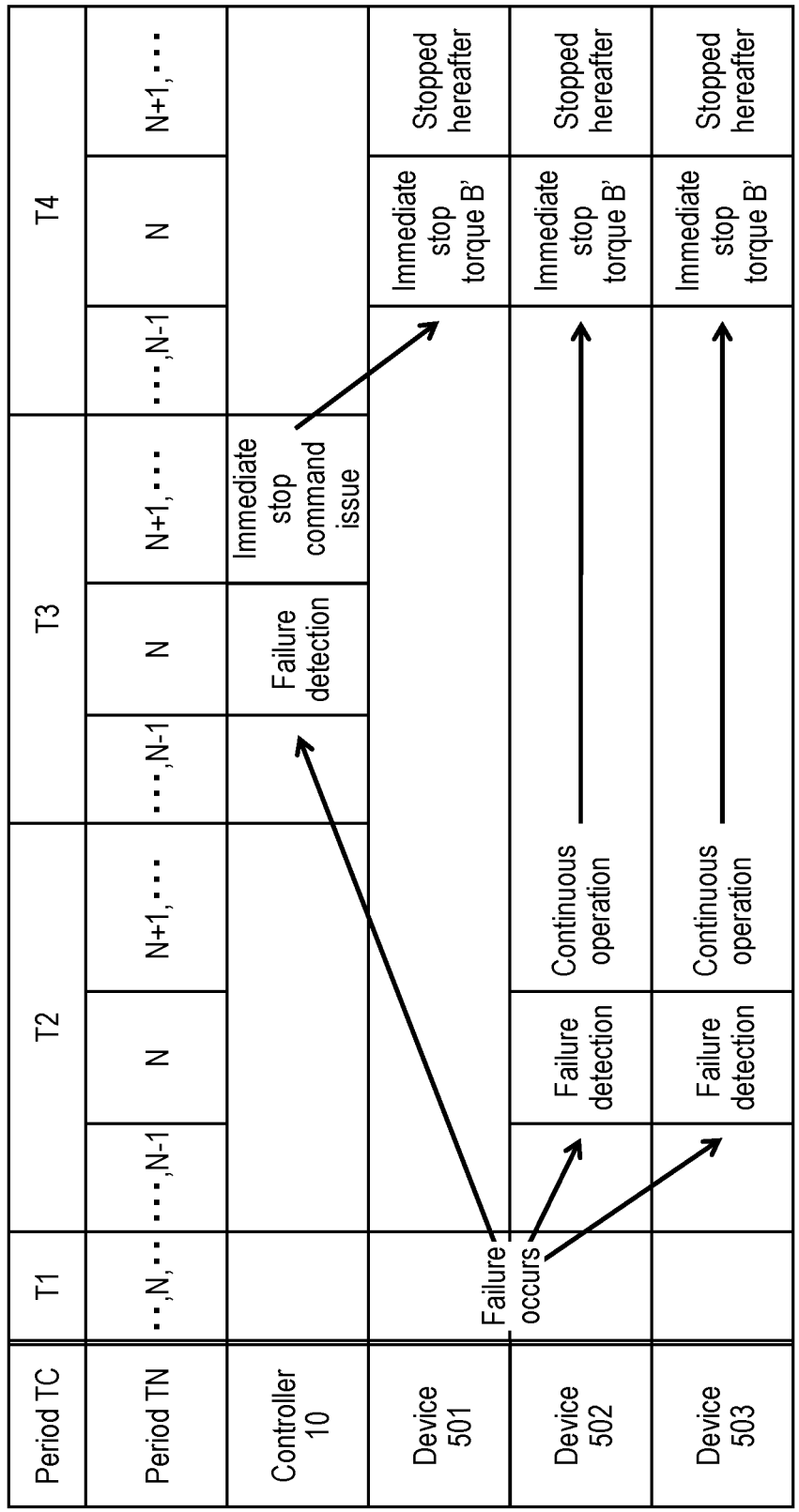
FIG. 14B is a chart of exemplary operation of each unit in this multiaxial motor control system, in a case where communication between the first-shaft motor control device and a second-shaft motor control device is interrupted.
Figure 14C:
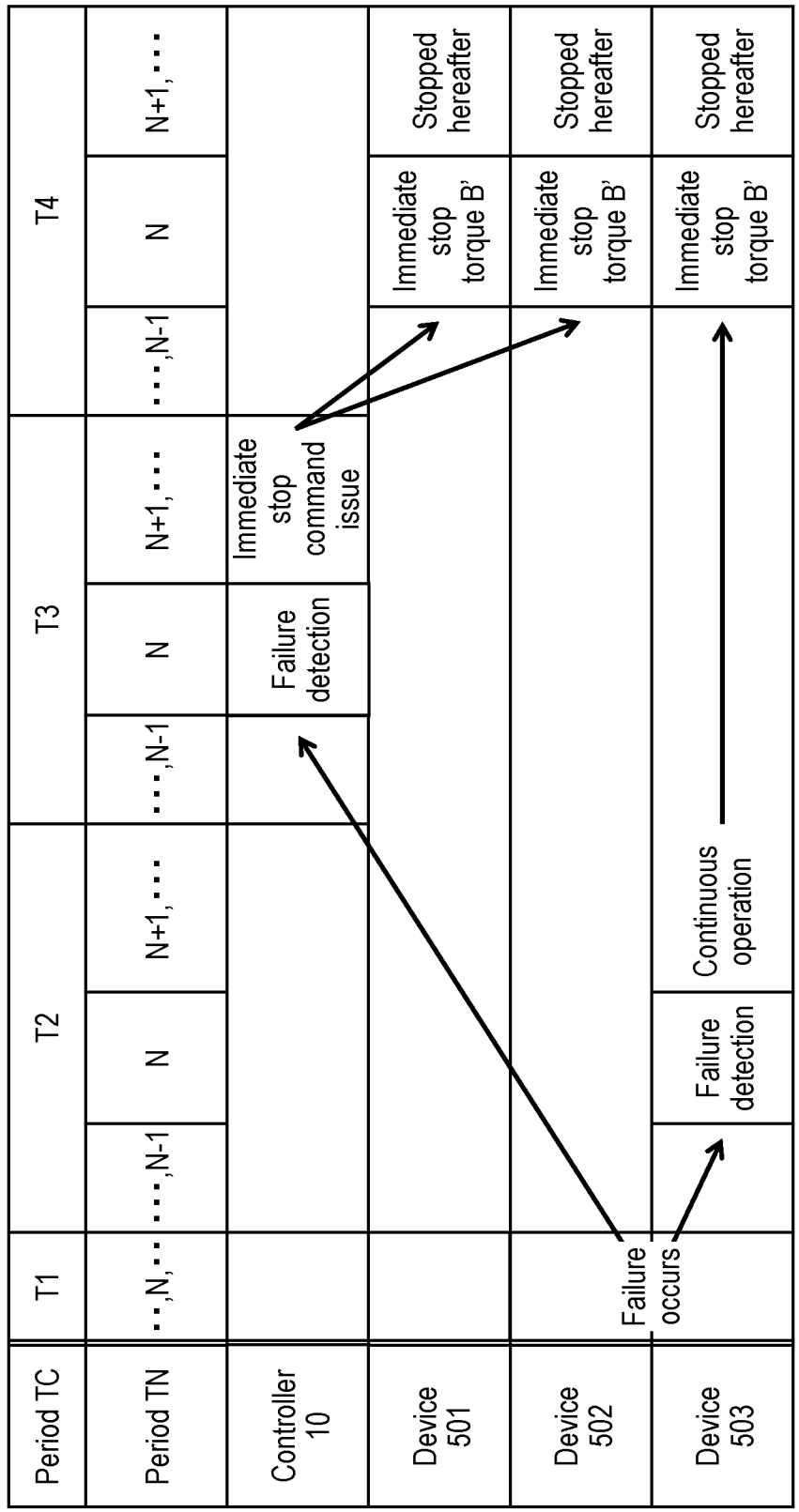
FIG. 14C is a chart of exemplary operation of each unit in this multiaxial motor control system, in a case where communication between the second-shaft motor control device and a third-shaft motor control device is interrupted.

FIG. 14A, FIG. 14B, and FIG. 14C (hereinafter, mentioned as FIG. 14A to FIG. 14C where appropriate) each indicate chronological operation of controller 10 and motor control devices 50 in a case where multiaxial motor control system 400 for three shafts depicted in FIG. 13 has communication failure as described in the first exemplary embodiment. FIG. 14A indicates exemplary operation of each unit in a case where communication between controller 10 and first-shaft motor control device 501 is interrupted. FIG. 14B indicates exemplary operation of each unit in a case where communication between first-shaft motor control device 501 and second-shaft motor control device 502 is interrupted. FIG. 14C indicates exemplary operation of each unit in a case where communication between second-shaft motor control device 502 and third-shaft motor control device 503 is interrupted. Operation during communication failure between third-shaft motor control device 503 and controller 10 is similar to exemplary operation 2D described with reference to FIG. 9D in the second exemplary embodiment, and will not be described in detail repeatedly. For better comprehension of operation according to the present exemplary embodiment, FIG. 14A to FIG. 14C each indicate mainly operation of controller 10 and motor control devices 50 relevant to emergency stop of motors 30 upon detection of communication failure. As in the third exemplary embodiment, hereinafter, the motor control devices will be specified appropriately by being identified as device 501, device 502, and device 503, while each of the motor control devices will generically be called motor control device 50.

(Exemplary Operation 4A)

Operation of each unit in a case where communication between controller 10 and first-shaft motor control device 501 is interrupted will be described initially as exemplary operation 4A.

As FIG. 14A indicates "failure occurs", communication between controller 10 and device 501 is interrupted during period TC=T1 as in exemplary operation 2A, due to break or the like of communication line A, or failure in communication function or the like of device 501 itself.

Subsequently during period TN=N in period TC=T2, communication controller 14 in each of device 501, device 502, and device 503 detects communication failure.

Although the communication failure is detected at this timing, in exemplary operation 4A, device 501, device 502, and device 503 subsequently each execute operation with switching to individual control for the own device in accordance with the latest command from controller 10 received most recently in the normal communication state (hereinafter, called continuous operation). The continuous operation is executed for time preset in each motor control device 50 as in exemplary operation 3A for the biaxial motor control system. The time will not be described in detail repeatedly.

Meanwhile, controller 10 detects communication failure and issues an immediate stop command for every motor 30 during period TC=T3. However, communication between controller 10 and device 501 has failure. A command signal from controller 10 obviously fails to reach each of device 501, device 502, and device 503. As described above, device 501, device 502, and device 503 each execute the continuous operation in accordance with individual control for the own device in this case.

After the time for the continuous operation elapses, device 501, device 502, and device 503 each execute immediate stop as indicated in FIG. 14A, not in accordance with a command received from controller 10 but in accordance with braking torque command Tb having braking torque value B' preset in torque amount storage 44 in rotation controller 24. Specifically, in each of device 501, device 502, and device 503, communication controller 14 outputs stop command Em1 indicating activation of the immediate stop, and rotation controller 24 executes the immediate stop function.

Braking torque value B' for the immediate stop in exemplary operation 4A preferably has an amount obtained through dividing allowable maximum torque of multiaxial motor control system 400 by a number of shafts to be immediately stopped. The three shafts are immediately stopped in the present exemplary operation, so that braking torque value B' preferably has an amount obtained through dividing the maximum torque by three as the number of the shafts. In other words, braking torque value B' corresponds to one third of the maximum braking torque value. Furthermore, three amounts of torque are more preferred to match one another to be an identical amount, so as to minimize the stop distances of the plurality of drive shafts. In consideration of safety and the like, braking torque can be set for each of the motor control devices such that a sum of the braking torque output from all the motor control devices is equal to or less than allowable maximum braking torque of the present multiaxial motor control system.

Exemplary operation 4A also does not adopt the conventional technique of immediately disconnecting electrification to every motor 30 for the non-drive stop when communication failure occurs between controller 10 and device 501, but includes application of braking torque such that the maximum braking torque is dispersed to the respective shafts while every motor 30 keeps being electrified. Execution of failure handling operation according to exemplary operation 4A enables motors 30 for the plurality of shafts to stop quickly and safely.

As described above with reference to exemplary operation 4A, in multiaxial motor control system 400 according to the present exemplary embodiment, each of device 501, device 502, and device 503 having detected failure outputs driving torque according to a command signal received normally before the failure detection to execute the continuous operation of the corresponding motor. After predetermined time from start of the continuous operation, all of device 501, device 502, and device 503 for control of the plurality of shafts each output braking torque preset in the rotation controller to stop the corresponding motor.

The present exemplary embodiment exemplifies the case where there are provided the three motor control devices. In a case where there are provided motor control devices for a plurality of shafts, the following configuration will be applicable. In a case where at least one motor control device detects failure in reception of a command signal, the at least one motor control device having detected the failure outputs driving torque according to a command signal received normally before the detection of the failure to execute the continuous operation of the motor. After the predetermined time from start of the continuous operation, all of the motor control devices for control of the plurality of shafts each output braking torque preset in the rotation controller to stop the corresponding motor. Such a configuration achieves similar effects.

(Exemplary Operation 4B)

Operation of each unit in a case where communication between device 501 and device 502 is interrupted will be described next as exemplary operation 4B.

As FIG. 14B indicates "failure occurs", communication between device 501 and device 502 is interrupted during period TC=T1, due to break or the like of communication line B, or failure in communication function or the like of device 502 itself.

Subsequently during period TN=N in period TC=T2, communication controller 14 in device 501 normally receives a command from controller 10, and device 501 executes ordinary operation. Meanwhile, communication controller 14 in each of device 502 and device 503 detects communication failure in response to the fact that "failure occurs".

Although the communication failure is detected at this timing, according to exemplary operation 4B, each of device 502 and device 503 subsequently switches to individual control for the own device and executes the continuous operation. The continuous operation is executed for time similar to the time according to exemplary operation 3B for the biaxial motor control system, and will not be described in detail repeatedly.

Meanwhile, controller 10 detects communication failure and issues an immediate stop command for every motor 30 during period TC=T3. In this case, device 501 continues the ordinary operation whereas device 502 and device 503 execute the continuous operation.

After the time for the continuous operation elapses, device 501 executes the immediate stop at braking torque value B' in accordance with the command received from controller 10. Meanwhile, device 502 and device 503 each execute the immediate stop not in accordance with a command received from controller 10, but in accordance with individual control for the own device in the continuous operation, at preset braking torque value B'. Braking torque value B' for the immediate stop in exemplary operation 4B preferably has an amount obtained through dividing allowable maximum torque of multiaxial motor control system 400 by the number of shafts to be immediately stopped. The three shafts are immediately stopped in the present exemplary operation, so that braking torque value B' preferably has an amount obtained through dividing the maximum torque by three as the number of the shafts. In other words, braking torque value B' corresponds to one third of the maximum braking torque value. Furthermore, three amounts of torque are more preferred to match one another to be an identical amount, so as to minimize the stop distances of the plurality of drive shafts. In consideration of safety and the like, braking torque can be set for each of the motor control devices such that a sum of the braking torque output from all the motor control devices is equal to or less than allowable maximum braking torque of the present multiaxial motor control system.

Exemplary operation 4B also does not adopt the conventional technique of immediately disconnecting electrification to every motor 30 for the non-drive stop when communication failure occurs between device 501 and device 502, but includes application of braking torque such that the maximum braking torque is dispersed to the respective shafts while every motor 30 keeps being electrified. Execution of failure handling operation according to exemplary operation 4B enables motors 30 for the plurality of shafts to stop quickly and safely.

As described above with reference to exemplary operation 4B, in multiaxial motor control system 400 according to the present exemplary embodiment, each of device 502 and device 503 having detected failure outputs driving torque according to a command signal received normally before the failure detection to execute the continuous operation of motor 30. After predetermined time from start of the continuous operation, each of device 502 and device 503 outputs braking torque preset in the rotation controller to stop the corresponding motor. In multiaxial motor control system 400 according to the present exemplary embodiment, device 501 not executing the continuous operation outputs braking torque according to a command signal received normally from controller 10 to stop the motor.

The present exemplary embodiment exemplifies the case where there are provided the two motor control devices. In a case where there are provided motor control devices for a plurality of shafts, the following configuration will be applicable. In a case where at least one motor control device detects failure in reception of a command signal, the at least one motor control device having detected the failure outputs driving torque according to a command signal received normally before the detection of the failure to execute the continuous operation of the motor. After the predetermined time from start of the continuous operation, at least one of the motor control devices having executed the continuous operation outputs braking torque preset in the torque controller to stop the motor. When at least one of the motor control devices not executing the continuous operation outputs braking torque according to a command signal received normally from the controller to stop the motor. Such a configuration achieves similar effects.

(Exemplary Operation 4C)

Operation of each unit in a case where communication between device 502 and device 503 is interrupted will be described next as exemplary operation 4C.

As FIG. 14C indicates "failure occurs", communication between device 502 and device 503 is interrupted during period TC=T1, due to break or the like of communication line D, or failure in communication function or the like of device 503 itself.

Subsequently during period TN=N in period TC=T2, communication controller 14 in each of device 501 and device 502 normally receives a command from controller 10, and device 501 and device 502 execute the ordinary operation. Meanwhile, communication controller 14 in device 503 detects communication failure in response to the fact that "failure occurs".

Although the communication failure is detected at this timing, according to exemplary operation 4C, device 503 subsequently switches to individual control for the own device and executes the continuous operation. The continuous operation is executed for time similar to the time according to exemplary operation 3B for the biaxial motor control system, and will not be described in detail repeatedly.

Meanwhile, controller 10 detects communication failure and issues an immediate stop command for every motor 30 during period TC=T3. In this case, device 501 and device 502 each continue the ordinary operation whereas device 503 executes the continuous operation.

After the time for the continuous operation elapses, device 501 and device 502 each execute the immediate stop at braking torque value B' in accordance with the command received from controller 10. Meanwhile, device 503 executes the immediate stop not in accordance with a command received from controller 10, but in accordance with individual control for the own device in the continuous operation, at preset braking torque value B'. Braking torque value B' for the immediate stop in exemplary operation 4C preferably has an amount obtained through dividing allowable maximum torque of multiaxial motor control system 400 by the number of shafts to be immediately stopped. The three shafts are immediately stopped in the present exemplary operation, so that braking torque value B' preferably has an amount obtained through dividing the maximum torque by three as the number of the shafts. In other words, braking torque value B' corresponds to one third of the maximum braking torque value. Furthermore, three amounts of torque are more preferred to match one another to be an identical amount, so as to minimize the stop distances of the plurality of drive shafts. In consideration of safety and the like, braking torque can be set for each of the motor control devices such that a sum of the braking torque output from all the motor control devices is equal to or less than allowable maximum braking torque of the present multiaxial motor control system.

Exemplary operation 4C also does not adopt the conventional technique of immediately disconnecting electrification to every motor 30 for the non-drive stop when communication failure occurs between device 502 and device 503, but includes application of braking torque while every motor 30 keeps being electrified. Execution of failure handling operation according to exemplary operation 4C enables motors 30 for the plurality of shafts to stop quickly and safely.

As described above with reference to exemplary operation 4C, in multiaxial motor control system 400 according to the present exemplary embodiment, device 503 having detected failure outputs driving torque according to a command signal received normally before the failure detection to execute the continuous operation of motor 30. After predetermined time from start of the continuous operation, device 503 outputs braking torque preset in the rotation controller to stop the motor. In multiaxial motor control system 400 according to the present exemplary embodiment, each of device 501 and device 502 not executing the continuous operation outputs braking torque according to a command signal received normally from controller 10 to stop the corresponding motor.

The present exemplary embodiment exemplifies the case where there are provided the two motor control devices. In a case where there are provided motor control devices for a plurality of shafts, the following configuration will be applicable. In a case where at least one motor control device detects failure in reception of a command signal, the at least one motor control device having detected the failure outputs driving torque according to a command signal received normally before the detection of the failure to execute the continuous operation of the motor. After the predetermined time from start of the continuous operation, at least one of the motor control devices having executed the continuous operation outputs braking torque preset in the torque controller to stop the motor. When at least one of the motor control devices not executing the continuous operation outputs braking torque according to a command signal received normally from the controller to stop the motor. Such a configuration achieves similar effects.

Fifth Exemplary Embodiment

FIG. 15 is a block diagram depicting a ring network configuration of multiaxial motor control system 500 for two shafts according to a fifth exemplary embodiment of the present invention. Multiaxial motor control system 500 depicted in FIG. 15 has ring connection and includes motors for two shafts to be controlled synchronously by motor control devices 20, and three asynchronous motor control devices 70. Specifically, three asynchronous motor control devices 70 are configured to execute control not in synchronization with first and second shafts and are connected in series to be each interposed between controller 10, first-shaft motor control device 201, and second-shaft motor control device 202 depicted in FIG. 1.

Asynchronous motor control devices 70 are similar to motor control devices 20 but are not configured to execute synchronous control of driving or stopping in the present invention.

A portion identical or corresponding to a portion according to the first exemplary embodiment will be denoted by an identical reference mark and will not be described partially.

Controller 10, motor control device 70, motor control device 201, motor control device 70, motor control device 202, motor control device 70, and controller 10 have network connection in the mentioned order via communication lines 11 specified as communication line E, communication line F, communication line G, communication line H, communication line I, and communication line J, respectively.

Multiaxial motor control system 500 thus configured initially has communication failure at communication line E, communication line F, or motor control device 70 disposed between communication line E and communication line F. In such a case, motor control device 201 and motor control device 202 according to the present exemplary embodiment, configured to execute synchronous control, execute emergency stop operation as in the case of detection of communication failure generated at communication line A in the first exemplary embodiment.

Communication failure occurs at communication line G, communication line H, or motor control device 70 disposed between communication line G and communication line H. In such a case, motor control device 201 and motor control device 202 according to the present exemplary embodiment, configured to execute synchronous control, execute emergency stop operation as in the case of detection of communication failure generated at communication line B in the first exemplary embodiment.

Furthermore, communication failure occurs at communication line I, communication line J, or motor control device 70 disposed between communication line I and communication line J. In such a case, motor control device 201 and motor control device 202 configured to execute synchronous control, execute emergency stop operation as in the case of detection of communication failure generated at communication line C in the first exemplary embodiment.

One or two of asynchronous motor control devices 70 are removed, or there is further provided an asynchronous motor control device in addition to asynchronous motor control devices 70. Also in such a case, motor control device 201 and motor control device 202 configured to execute synchronous control can obviously execute emergency stop operation as in the first exemplary embodiment by appropriately adopting that described above.

A multiaxial motor control system for three or more shafts corresponding to motors and controlled synchronously also includes a motor control device configured not to execute synchronous control. Also in such a case, emergency stop operation can obviously be executed as in the second exemplary embodiment or the fourth exemplary embodiment by appropriately adopting that described above.

Also in a case of a configuration (not depicted) obtained by applying difference between the multiaxial motor control system having ring connection depicted in FIG. 1 and the multiaxial motor control system having ring connection depicted in FIG. 15 to the multiaxial motor control system having line connection depicted in FIG. 2, emergency stop operation can be executed as in the first exemplary embodiment.

INDUSTRIAL APPLICABILITY

As described above, the multiaxial motor control system according to the present invention is configured to control the motor control devices for a plurality of shafts having network connection with the controller. When the motor control devices are controlled in such a configuration, communication failure may occur due to break or the like of a communication line or malfunction of any device on the network and each of the motor control devices may fail to receive a command signal from the controller. The present invention enables motors for the plurality of shafts to be stopped safely and quickly by application of braking torque even during such communication failure, while at least one of the motors keeps being electrified.

REFERENCE MARKS IN THE DRAWINGS 10 controller
11 communication line
12 transmitter
13 receiver
14 communication controller
17 transmitting-receiving device
20, 50, 70, 201, 202, 203, 501, 502, 503 motor control device (device)
24 rotation controller
25, 55 drive unit
26 DB circuit (dynamic brake circuit)
30 motor
31 coil
32 position detector
35 control target mechanism
36 load
41 position controller
43 speed controller
44 torque amount storage
46 torque processor
51 drive output generator
53 drive voltage switch
61 DB switch
63 DB resistor
100, 110, 200, 300, 400, 500 multiaxial motor control system

The invention claimed is:

1. A multiaxial motor control system configured to control motors for a plurality of shafts included in a multiaxial machine, the multiaxial motor control system comprising:
 a plurality of motor control devices each configured to drive a corresponding one of the motor, wherein each of the plurality of motor control devices generates a first torque command based on a first command signal, and stops each of the motors by applying a first braking torque corresponding to the first torque command; and
 a controller having network connection with the plurality of motor control devices, the controller being connected with the plurality of motor control devices by a ring network or a line network, wherein the controller is configured to transmit a second command signal when the controller controls the plurality of motor control devices and transmit the first command signal to control the plurality of motor control devices when the controller detects a failure of the plurality of motor control devices or a failure of the ring network or a line network, wherein:
 each of the plurality of motor control devices includes:
  a communication controller configured to receive the second command signal, transmit the received second command signal to another of the plurality of motor control devices, and determine whether or not the second command signal is received normally,
  a rotation controller configured to generate a second torque command for operation of the corresponding one of the motors, and
  a drive unit configured to generate a drive voltage for electrification to drive the corresponding one of the motors in accordance with the second torque command,
 the plurality of motor control devices include a first motor control device provided at a signal receiving side of a location of a failure in the network,
 the first motor control device disconnects electrification to a motor connected to the first motor control device, when the communication controller of the first motor control device detects failure in reception of the second command signal,
 the plurality of motor control devices further include a second motor control device provided at the signal receiving side of the location of the failure in the network, the second motor control device being connected to the first motor control device in a series connection in the network so that the first motor control device communicates the second motor control device bypassing the controller, and
 the second motor control device generates a third torque command preliminary set by the rotation controller of the second motor control device and stops a motor connected to the second motor control device by applying a second control torque when the communication controller detects the failure of the reception of the second command signal, the second control torque corresponding to the third torque command.

2. The multiaxial motor control system of claim 1, further including:
 a second motor control device at a signal transmitting side of a location of a failure in the network, and
 a plurality of first motor control devices including the first motor control device, wherein
  each of the plurality of first motor control devices disconnects electrification to the each of the motors connected to the first motor control device, when the communication controller detects failure in reception of the second command signal, and
  the second motor control device generates the first torque command when the second motor control device receives the first command signal, the first command signal being output when the controller detects the failure.

3. The multiaxial motor control system of claim 1, wherein the communication controller transmits a response signal to the controller, and
 the controller outputs the first command signal when the controller detects a failure of a reception of the response signal.

4. The multiaxial motor control system of claim 1, wherein
 the plurality of motor control devices includes a second motor control device and a third motor control device, the second motor control device being positioned at a signal transmitting side of a location of a failure in the network, and the third motor control device being positioned at the signal receiving side of a location of a failure in the network, the second motor control device generates the first torque command and stops the motors connected to the second motor control devices by applying the first braking torque corresponding to the first torque command when the controller receive the first command signal, the first command signal being output when the controller detects the failure, the third motor control device generates third torque command which is preliminary set by the rotation controller and stops motor connected to the third motor control devices by applying second braking torque corresponding to the third torque command, and a sum of an amount of the first braking torque and an amount of the second braking torque is equal to or less than allowable maximum braking torque of the multiaxial motor control system.

5. A multiaxial motor control system configured to control motors for a plurality of shafts included in a multiaxial machine, the multiaxial motor control system comprising:
a plurality of motor control devices each configured to drive a corresponding one of the motors, the plurality of motor control devices generate a first torque command based on a first command signal, and stops each of the motors for the plurality of shafts by applying a first braking torque corresponding to the first torque command, and
a controller connected with the plurality of motor control devices by a ring network or a line network, wherein the controller is configured to transmit a second command signal when the controller drives the plurality of motor control devices and transmit the first command signal when the controller detects a failure of the plurality of motor control devices or a failure of the network, wherein:
each of the plurality of motor control devices includes:
a communication controller configured to receive a second command signal, transmit the received second command signal, and determine whether or not the second command signal is received normally,
a rotation controller configured to generate a second torque command for operation of the each of the motors, and
a drive unit configured to generate a drive voltage for electrification to drive the corresponding one of the motors based on the second torque command,
at least one of the plurality of motor control devices is configured to communicate another of the plurality of motor control device bypassing the controller,
the plurality of motor control devices includes a first motor control device at signal receiving side of a location of a failure in the network, and
the first motor control device continues to operate a motor connected with the first motor control device by applying a second driving torque based on the second command signal which is received normally before the detection of the failure, and stops the motor connected with the first motor control device by applying a third braking torque at a predetermined time after a beginning of the operation to continue, when the communication controller detects the failure of a reception of the second command signal.

6. The multiaxial motor control system of claim 5, wherein the plurality of motor control devices includes a second motor control device at signal transmitting side of a location of a failure in the network, and
the second motor control device generates the first torque command based on the first command signal, when the communication controller receives the first command signal, and stops the motor connected with each of the second motor control devices.

7. The multiaxial motor control system of claim 6, wherein the predetermined time is preset in each of the motor control devices as a time from a start of the continuous operation until the braking torque set in the rotation controller is output and the corresponding one of the motors is stopped.

8. The multiaxial motor control system of claim 7, wherein the predetermined time is set to be k times of a reference period for transmission of the command signal by the controller, where k is a natural number.

9. The multiaxial motor control system of claim 6, wherein a total amount of a sum of an amount of the first braking torque of the second motor control device and a sum of an amount of the third braking torque of the first motor control device is equal to or less than allowable maximum braking torque of the multiaxial motor control system.

10. The multiaxial motor control system of claim 5, wherein the predetermined time is preset in each of the motor control devices as a time from the start of the continuous operation until the braking torque set in the rotation controller is output and the corresponding one of the motors is stopped.

11. The multiaxial motor control system of claim 10, wherein the predetermined time is set to be k times of a reference period for transmission of the command signal by the controller, where k is a natural number.

12. The multiaxial motor control system of claim 5, wherein a sum of an amount of the third braking torque of the first motor control devices is equal to or less than allowable maximum braking torque of the multiaxial motor control system.

13. The multiaxial motor control system of claim 1, wherein the second motor control device further includes a dynamic break circuit that is activated to disconnect electrification to a corresponding one of the motors to stop the motors, and the dynamic brake circuit includes a plurality of switches and a plurality of resistors, each of the switches and each of the resistors corresponding to each of respective phases of each of the motors.

14. The multiaxial motor control system of claim 13, wherein each of the plurality of the switches is switched ON or OFF in accordance with third stop command from communication controller.

15. The multiaxial motor control system of claim 13, wherein each of the plurality of the switches has a first end connected to an input port for drive voltage of corresponding coil of the motor and a second end connected to a first end of corresponding resistor, and second ends of the plurality of the resistors are connected with each other.

16. The multiaxial motor control system of claim 5, wherein the second motor control device further includes a dynamic break circuit that is activated to disconnect electrification to a corresponding one of the motors to stop the motors, and the dynamic brake circuit includes a plurality of switches and a plurality of resistors, each of the switches and each of the resistors corresponding to each of respective phases of each of the motors.

17. The multiaxial motor control system of claim 16, wherein each of the plurality of the switches is switched ON or OFF in accordance with third stop command from communication controller.

18. The multiaxial motor control system of claim 16, wherein each of the plurality of the switches has a first end connected to an input port for drive voltage of corresponding coil of the motor and a second end connected to a first end of corresponding resistor, and second ends of the plurality of the resistors are connected with each other.

19. A multiaxial motor control system configured to control motors for a plurality of shafts included in a multiaxial machine, the multiaxial motor control system comprising:
- a plurality of motor control devices each configured to drive a corresponding one of the motor; and
- a controller having network connection with the motor control devices and configured to transmit a command signal for control of the motor control devices, wherein:
- the motor control devices each include
  - a communication controller configured to receive the command signal, transmit the received command signal, and determine whether or not the command signal is received normally,
  - a rotation controller configured to generate a torque command for operation of the corresponding one of the motors, and
  - a drive unit configured to generate a drive voltage for electrification to drive the corresponding one of the motors in accordance with the torque command,
- when at least one of the motor control devices detects failure in reception of the command signal, the at least one of the motor control devices outputs the torque command for braking torque to stop the corresponding one of the motors,
- the plurality of motor control devices are connected in series so that at least one of the plurality of motor control devices is configured to communicate another of the plurality of motor control device bypassing the controller,
- the controller and the plurality of motor control devices are connected to form a ring network so that only a first one of the plurality of motor control devices connected in series and a last one of the plurality of motor control devices connected in series are directly communicable with the controller, or to form a line network so that only a first one of the plurality of motor control devices connected in series is directly communicable with the controller.

20. A multiaxial motor control system configured to control motors for a plurality of shafts included in a multiaxial machine, the multiaxial motor control system comprising:
- a plurality of motor control devices each configured to drive a corresponding one of the motors, wherein each of the plurality of the motor control devices generates a first torque command based on a first command signal, and stops each of the motors for a plurality of shafts by applying a first braking torque corresponding to the first torque command; and
- a controller having network connection with the plurality of motor control devices, the controller being connected with the plurality of motor control devices by a ring network or a line network, wherein the controller is configured to transmit a second command signal when the controller controls the plurality of motor control devices and transmit the first command signal when the controller detects a failure of the plurality of motor control devices or a failure of the ring network or a line network,
- wherein each of the plurality of motor control devices includes,
  - a communication controller configured to receive the second command signal, transmit the received second command signal, and determine whether or not the second command signal is received normally,
  - a rotation controller configured to generate a second torque command for operation of the corresponding one of the motors, and
  - a drive unit configured to generate a drive voltage for electrification to drive the corresponding one of the motors in accordance with the second torque command,
  - the plurality of motor control devices includes a first motor control device provided at a signal receiving side of a location of a failure in the network,
  - the first motor control devices further include a dynamic brake circuit that is activated to disconnect electrification to a corresponding one of the motors to stop the motor, the dynamic break circuit comprising a plurality of switches and a plurality of resistors, each of the switches and each of the resistors corresponding to each of respective phases of the motors.

21. The multiaxial motor control system of claim 19, wherein each of the plurality of the switches is switched ON or OFF in accordance with third stop command from communication controller.

22. The multiaxial motor control system of claim 19, wherein each of the plurality of the switches has a first end connected to an input port for drive voltage of corresponding coil of the motor and a second end connected to a first end of corresponding resistor, and second ends of the plurality of the resistors are connected with each other.

23. The multiaxial motor control system of claim 20, wherein each of the plurality of the switches is switched ON or OFF in accordance with third stop command from communication controller.

24. The multiaxial motor control system of claim 20, wherein each of the plurality of the switches has a first end connected to an input port for drive voltage of corresponding coil of the motor and a second end connected to a first end of corresponding resistor, and second ends of the plurality of the resistors are connected with each other.

* * * * *